US008437983B2

(12) United States Patent
Kobashi et al.

(10) Patent No.: US 8,437,983 B2
(45) Date of Patent: May 7, 2013

(54) METHOD FOR DETERMINING DEFINITE CLOCK AND NODE APPARATUS

(75) Inventors: Hiromichi Kobashi, Kawasaki (JP);
Yuichi Tsuchimoto, Kawasaki (JP);
Miho Murata, Kawasaki (JP);
Nobutaka Imamura, Kawasaki (JP);
Toshiaki Saeki, Kawasaki (JP); Yasuo Yamane, Kawasaki (JP); Hiroki Moue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 13/015,931

(22) Filed: Jan. 28, 2011

(65) Prior Publication Data

US 2011/0184698 A1 Jul. 28, 2011

(30) Foreign Application Priority Data

Jan. 28, 2010 (JP) .................................. 2010-16979

(51) Int. Cl.
*G06F 15/00* (2006.01)
(52) U.S. Cl.
USPC .......................................................... 702/176
(58) Field of Classification Search ................... 702/176
See application file for complete search history.

(56) References Cited

U.S. PATENT DOCUMENTS

2006/0041556 A1* 2/2006 Taniguchi et al. .............. 707/10
2008/0172423 A1 7/2008 Shinkai et al.

FOREIGN PATENT DOCUMENTS

JP 2000-259473 9/2000
WO WO-2007/032046 3/2007

* cited by examiner

Primary Examiner — Bryan Bui
(74) Attorney, Agent, or Firm — Fujitsu Patent Center

(57) ABSTRACT

A clock determination method executed by a first one of apparatuses included in a system includes receiving a list including first definite clock values of respective apparatuses, the list being circulated among the apparatuses; determining the first clock value of the first apparatus at a point in time based on a smallest of logical clock values regarding corresponding commands on which processing is not completed, the commands being included in commands received by the first apparatus and the logical clock values being obtained at a time of receiving the corresponding commands and being stored, and updating the first clock value, the updated first clock value being included in the list, by using the determined first clock value; specifying, as a second clock value for the system, a smallest of the first clock values included in the updated list; and transmitting the updated list to a second one of the apparatuses.

6 Claims, 21 Drawing Sheets

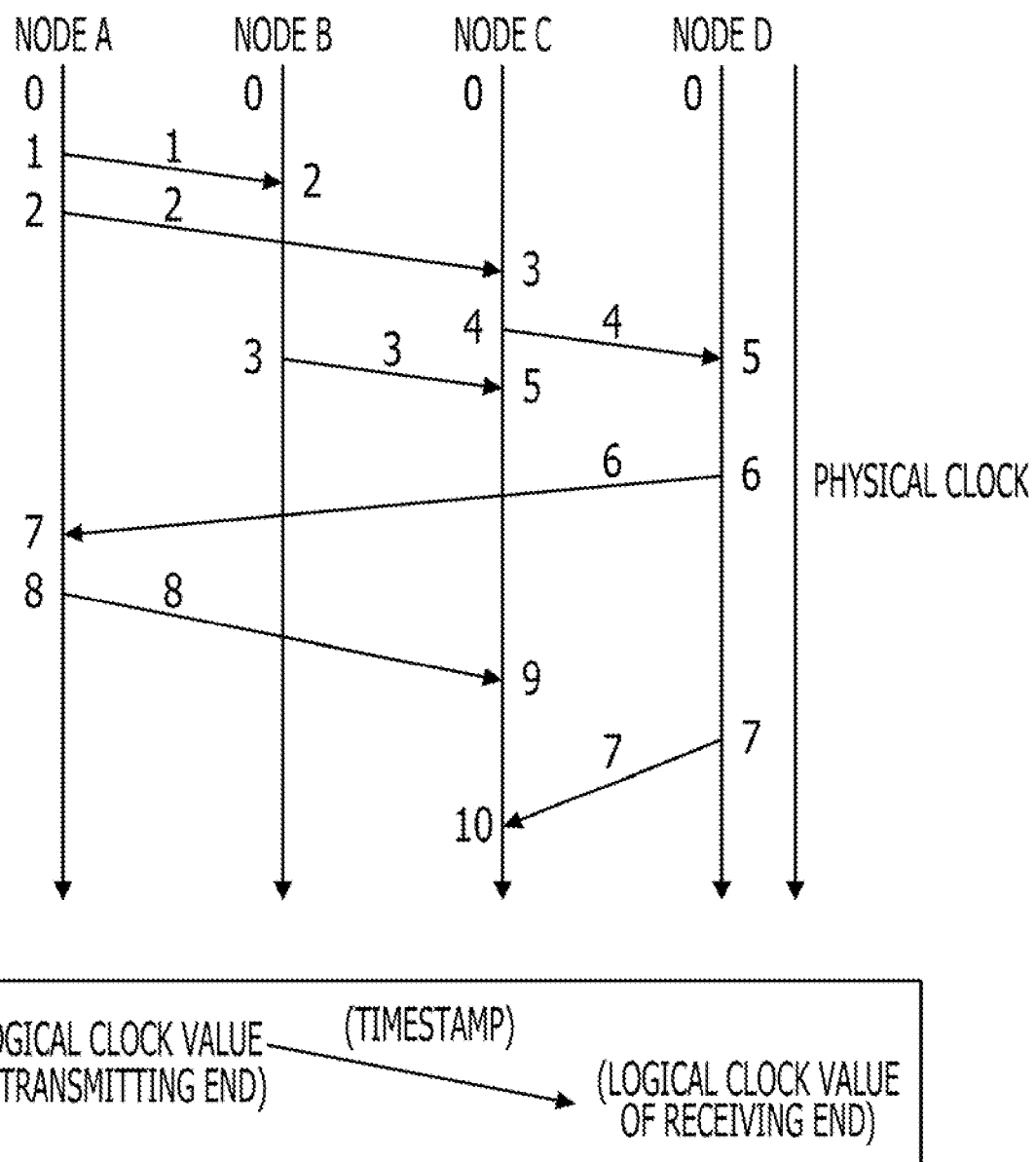

METHOD FOR DETERMINING DEFINITE CLOCK AND NODE APPARATUS

CROSS REFERENCES TO RELATED APPLICATIONS

This application is based upon and claims the benefit of priority of the prior Japanese Patent Application No. 2010-16979, filed on Jan. 28, 2010, the entire contents of which are incorporated herein by reference.

FIELD

The embodiments discussed herein are related to data consistency determination technology for a distributed processing system.

BACKGROUND

In recent years, for example, systems that implement eventual consistency are referred to as distributed processing systems. The concept of the eventual consistency is that although data may have inconsistencies at one point in time, the data may become consistent eventually.

FIG. 1 illustrates one example of a distributed processing system that implements eventual consistency. In the example of FIG. 1, the distributed processing system includes nodes A to D that serve to execute processing. Each node is provided with a distributed processing framework (hereinafter simply referred to as a "framework") for achieving eventual consistency. In the example of FIG. 1, the nodes A to C are adapted to hold replicas of data. For example, when the node A receives a command (a set command) for setting a data value "a", it determines a node that is to serve as a storage location of the data, by using a distributed hash table (DHT) or the like. For example, when the nodes A to C are determined as storage locations, the node A stores the data value "a" in its own database and also transfers the data value "a" to the nodes B and C. As a result, the data value "a" propagates to the nodes B and C through cooperation of the frameworks and is stored in the databases of the nodes B and C. Arrows indicated by the solid lines in FIG. 1 represent flows of data transferred in response to the set command. A node that has received a command may be referred to as a "receptor". A node that serves to store data may be called a "container".

After the data value "a" is stored in the databases of the nodes B and C, when the node D receives a command (a get command) for obtaining the data, the frameworks cooperate with each other to obtain the data value "a" from any of the databases of the nodes A to C in which the data is stored and to output the obtained data value "a" to a request source of the get command. FIG. 1 illustrates an example in which the data is obtained from the database of the node C. Arrows indicated by the long dashed double-short dashed line in FIG. 1 represent a flow of the data transferred in response to the get command.

For example, in a state in which the data value "a" is stored in the nodes A to C, when the node A further receives a set command (for a data value "b"), the node A first rewrites the data value "a" stored in its own database to "b", as illustrated in FIG. 2. In addition, the data value "b" propagates to the nodes B and C through cooperation of the frameworks. In this case, for example, when the node D receives a get command for obtaining the data value "b" from the node C before it propagates to the node C, the node D obtains the data value "a" since it is not rewritten to the data value "b" yet. After a certain period of time passes, attempting to re-obtain the data makes it possible to obtain the updated data value "b".

As described above, in the distributed processing system that implements eventual consistency, there is also a case in which an updated data value cannot be obtained at a certain point in time, but, after a certain period of time passes, the update data value can be obtained unless another data update is performed. In the distributed processing system that implements eventual consistency, since the databases are not locked during data update, for example, the scalability of the system can be enhanced.

In the distributed processing system, a scheme (e.g., Lamport algorithm) in which a logical clock is used to represent the order relationship of processing between the nodes has been known. For example, as illustrated in FIG. 3, a transmitting node attaches, as a time stamp, a logical clock value at the time of transmission to a message and transmits the resulting message and a receiving node determines, as a new logical clock value, a value obtained by adding a predetermined number ("1" in FIG. 3) to the time stamp attached to the message. Thus, with the logical clock, time just proceeds and is not reversed (i.e., the logical clock value just increases and does not decrease). In FIG. 3, a numeric value at the starting point of each arrow represents the logical clock value of the transmitting node and a numeric value of the end point of each arrow represents the logical clock value of the receiving node. A numeric value indicated above each arrow represents the timestamp set by the transmitting node (i.e., the logical clock value at the time of transmission).

For example, in FIG. 3, when an event occurs at the node A and the logical clock value of the node A is 1, a message (a timestamp indicating 1) is transmitted from the node A to the node B. The logical clock value at the node B is 0 before reception of the message. After reception of the message, however, the node B determines that the logical clock value has increased to 1 since the timestamp included in the received message is 1 and thus uses, as a new logical clock value, a value (=2) obtained by adding 1 to the timestamp. Subsequently, when an event occurs at the node A and the logical clock value of the node A is 2, a message (a timestamp indicating 2) is transmitted from the node A to the node C. The logical clock value at the node C is 0 before reception of the message. After reception of the message, however, the node C determines that the logical clock value has increased to 2 since the timestamp included in the received message is 2 and thus uses, as a new logical clock value, a value (=3) obtained by adding 1 to the timestamp. Subsequently, when an event occurs at the node C and the logical clock value of the node C is 4, a message (a timestamp indicating 4) is transmitted from the node C to the node D. The logical clock value at the node D is 0 before reception of the message. After reception of the message, however, the node D determines that the logical clock value has increased to 4 since the timestamp included in the received message is 4 and thus uses, as a new logical clock value, a value (=5) obtained by adding 1 to the timestamp. When an event occurs at the node B and the logical clock value of the node B is 3, a message (a timestamp indicating 3) is transmitted from the node B to the node C. Although the timestamp included in the message received by the node C is 3, the logical clock value of the node C has increased to 4. Thus, the node C uses, as a new logical clock value, a value (=5) obtained by adding 1 to the logical clock value of the node C. Subsequently, when an event occurs at the node D and the logical clock value of the node D is 6, a message (a timestamp indicating 6) is transmitted from the node D to the node A. The logical clock value at the node A is 2 before reception of the message. After reception of the message, however, the node A determines that the logical clock value has increased to 6 since the timestamp included in the received message is 6 and thus uses, as a new logical clock value, a value (=7) obtained by adding 1 to the timestamp. Subsequently, when an event occurs at the node A and the logical clock value of the node A is 8, a message (a timestamp indicating 8) is transmitted from the node A to the node C. The logical clock value at the node C is 5 before reception of the message. After reception of the message, however, the node C determines that the logical clock value has increased to 8 since the timestamp included in the received message is 8 and thus uses, as a new logical clock value, a value (=9) obtained by adding 1 to the timestamp. When an event occurs at the node D and the logical clock value of the node D is 7, a message (a timestamp indicating 7) is transmitted from the node D to the node C. Although the timestamp included in the message received by the node C is 7, the logical clock value of the node C has increased to 9. Thus, the node C uses, as a new logical clock value, a value (=10) obtained by adding 1 to the logical clock value of the node C. As described above, each node performs the processing while changing the logical clock value. However, even though the processing associated with one logical clock value is completed at one node, processing associated with the same logical clock value is not necessarily completed at other nodes.

SUMMARY

According to a certain aspect of the invention, a clock determination method executed by a first one of node apparatuses included in a distributed processing system includes receiving a clock list including first definite clock values of respective node apparatuses, the clock list being circulated among the node apparatuses; determining the first clock value of the first node apparatus at a point in time based on a smallest of logical clock values with respect to corresponding commands on which processing is not completed, the commands being included in commands received by the first node apparatus and the logical clock values being obtained at a time of receiving the corresponding commands and being stored in a command-list storage unit, and updating the first clock value of the first node apparatus, the updated first clock value being included in the clock list, by using the determined first clock value; specifying, as a second clock value for the distributed processing system, a smallest of the first clock values included in the updated clock list; and transmitting the updated clock list to a second one of the node apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates a logical clock of the related art;

DESCRIPTION OF EMBODIMENTS

Figure 1:
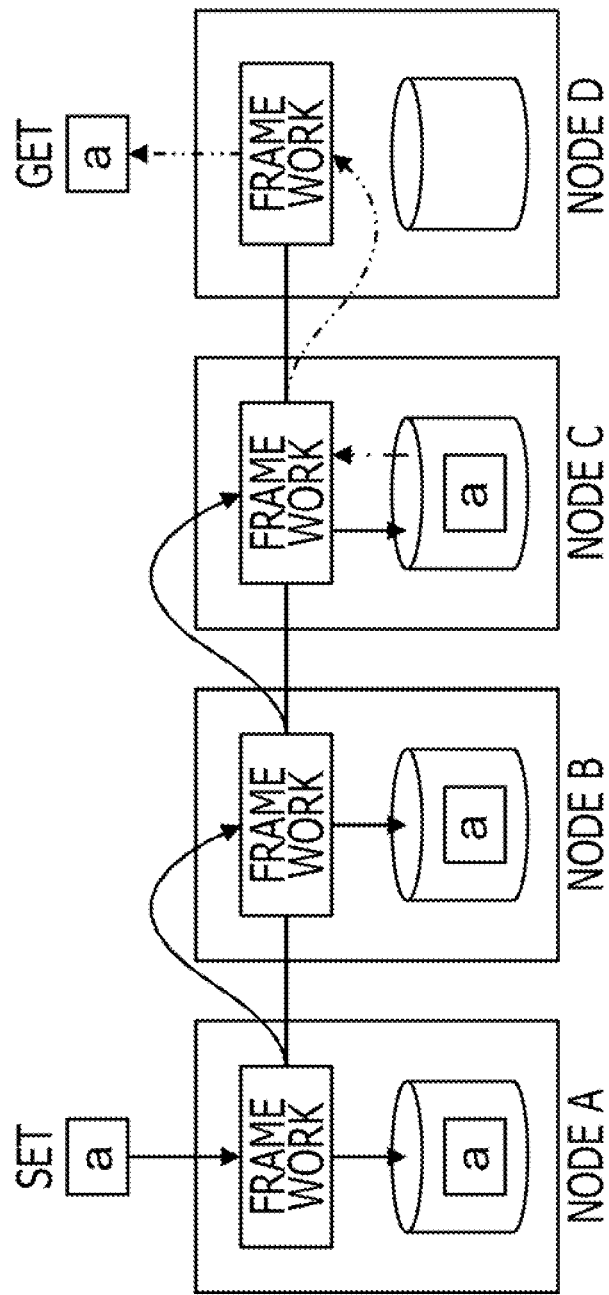
FIG. 1 illustrates a first operation example of a distributed processing system of related art, the distributed processing system implementing eventual consistency.
Figure 2:
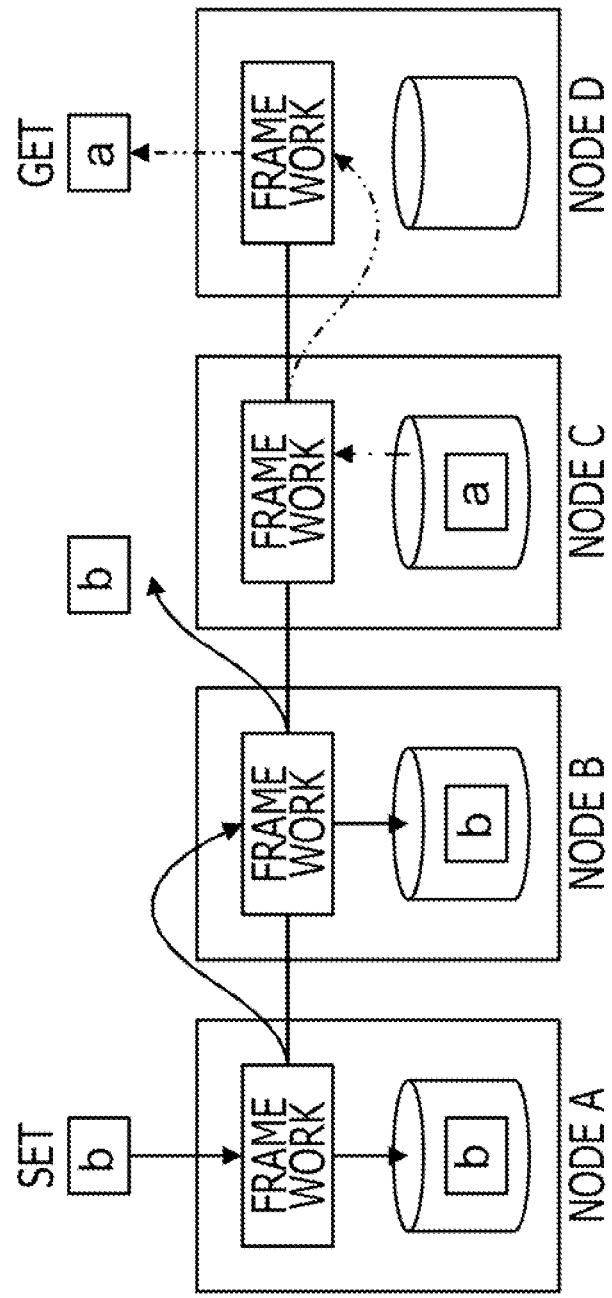
FIG. 2 illustrates a second operation example of the distributed processing system of the related art, the distributed processing system implementing eventual consistency.
Figure 4A:
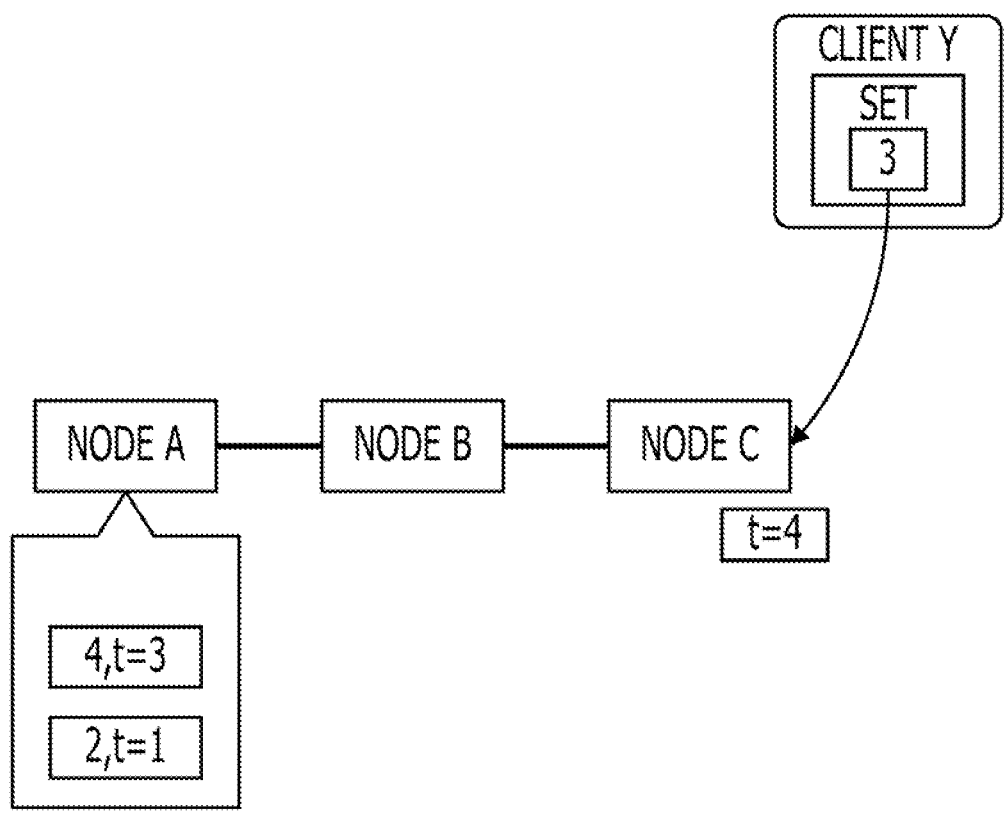
FIGS. 4A and 4B illustrate a problem.

For example, in the distributed processing system that implements eventual consistency, when data is updated for one logical clock value, there is no guarantee that immediately after the update, the updated data can be obtained without fail. FIG. 4A illustrates one example of a case in which a set command is received for one logical clock value. It is assumed that, in FIG. 4A, the logical clock value when the node C receives the set command (for a data value "3") from a client Y is 4. The value of t in FIG. 4A represents a logical clock value (the same applies to a description below). In addition, the nodes A to C are adapted to hold the replicas of data. Thus, in FIG. 4A, after the node C receives a set command (for a data value "3") from the client Y, the data value "3" propagates to the nodes A and B through cooperation of the frameworks as described above. In the example of FIG. 4A, it is assumed that for t=1, any of the nodes A to C receives a data value "2", and for t=3, any of the nodes A to C receives a data value "4".

Figure 4B:
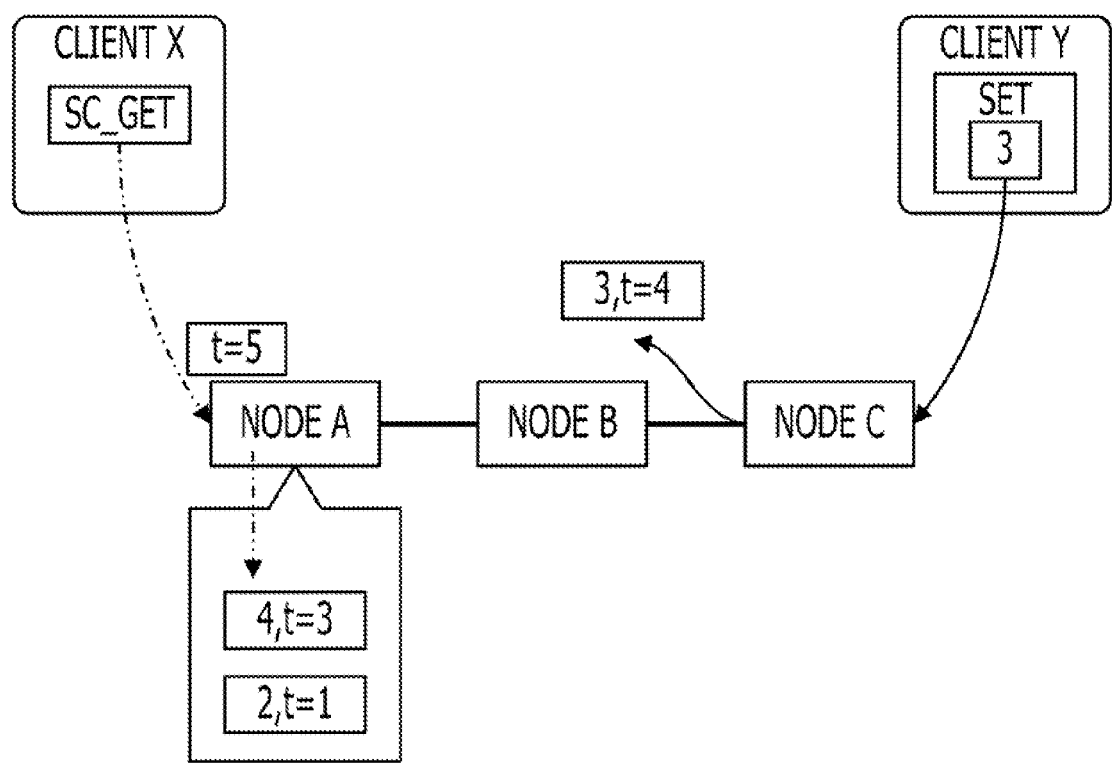

The concept of the eventual consistency, however, is that it is good enough if data are consistent eventually, and thus does not have a perspective of at which point in time the data become consistent (i.e., when the data are made definite). Accordingly, in the distributed processing system that implements eventual consistency, consistent data corresponding to one logical clock value cannot be obtained. Herein, a command for obtaining consistent data corresponding to a specific logical clock value is referred to as an "strict_get command". For example, as illustrated in FIG. 4B, it is assumed that the node A receives the strict_get command from a client X before a data value "3" received for t=4 propagates from the node C to the node A. In FIG. 4B, it is assumed that the logical clock value when the node A receives the strict_get command from the client X is 5. In this case, the node A should obtain consistent data corresponding to t=5 and output the consistent data to the client X, but cannot determine at which timing the data for t=5 was made define.

As described above, the distributed processing system that implements eventual consistency does not have a perspective of which point in time data is made definite. Thus, in the distributed processing system that implements eventual consistency, which data has already been made definite in the entire system cannot be tracked while the logical clock changes. A logical clock value indicating a point in time at which data is already made definite is hereinafter referred to as a "definite clock value".

First Embodiment

Figure 5:
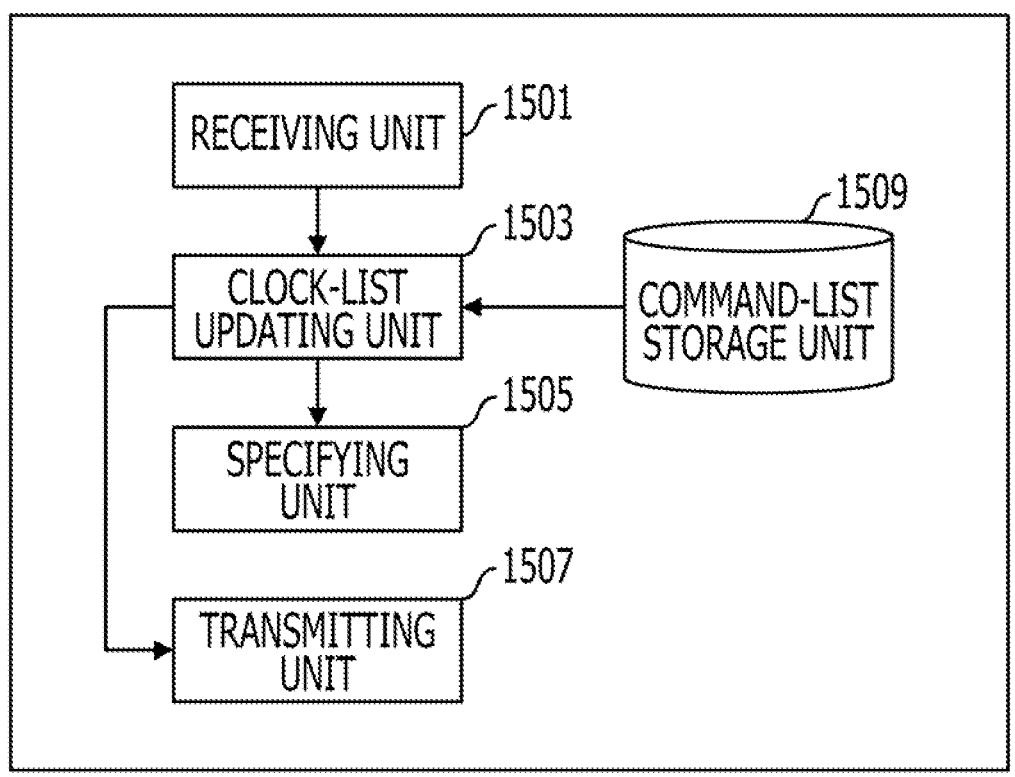
FIG. 5 illustrates an example of a node apparatus according to a first embodiment.

FIG. 5 is a functional block diagram of a node apparatus according to a first embodiment. A node apparatus according to a first embodiment includes a receiving unit 1501, a clock-list updating unit 1503, a specifying unit 1505, a transmitting unit 1507, and a command-list storage unit 1509. A plurality of the node apparatuses illustrated in FIG. 5 are used to construct a distributed processing system. The receiving unit 1501 receives data from, for example, another one of the node apparatuses in the distributed processing system. The clock-list updating unit 1503 performs processing using the data received by the receiving unit 1501 and data stored in the command-list storage unit 1509. Logical clock values with respect to corresponding commands that are included in commands received by the local node apparatus and that are being processed, and the logical clock values being obtained at the time of receiving the corresponding commands, are stored in the command-list storage unit 1509. The specifying unit 1505 performs processing using a result of the processing performed by the clock-list updating unit 1503. The transmitting unit 1507 transmits a result of the processing, performed by the clock-list updating unit 1503, to another one of the node apparatuses in the distributed processing system.

Figure 6:
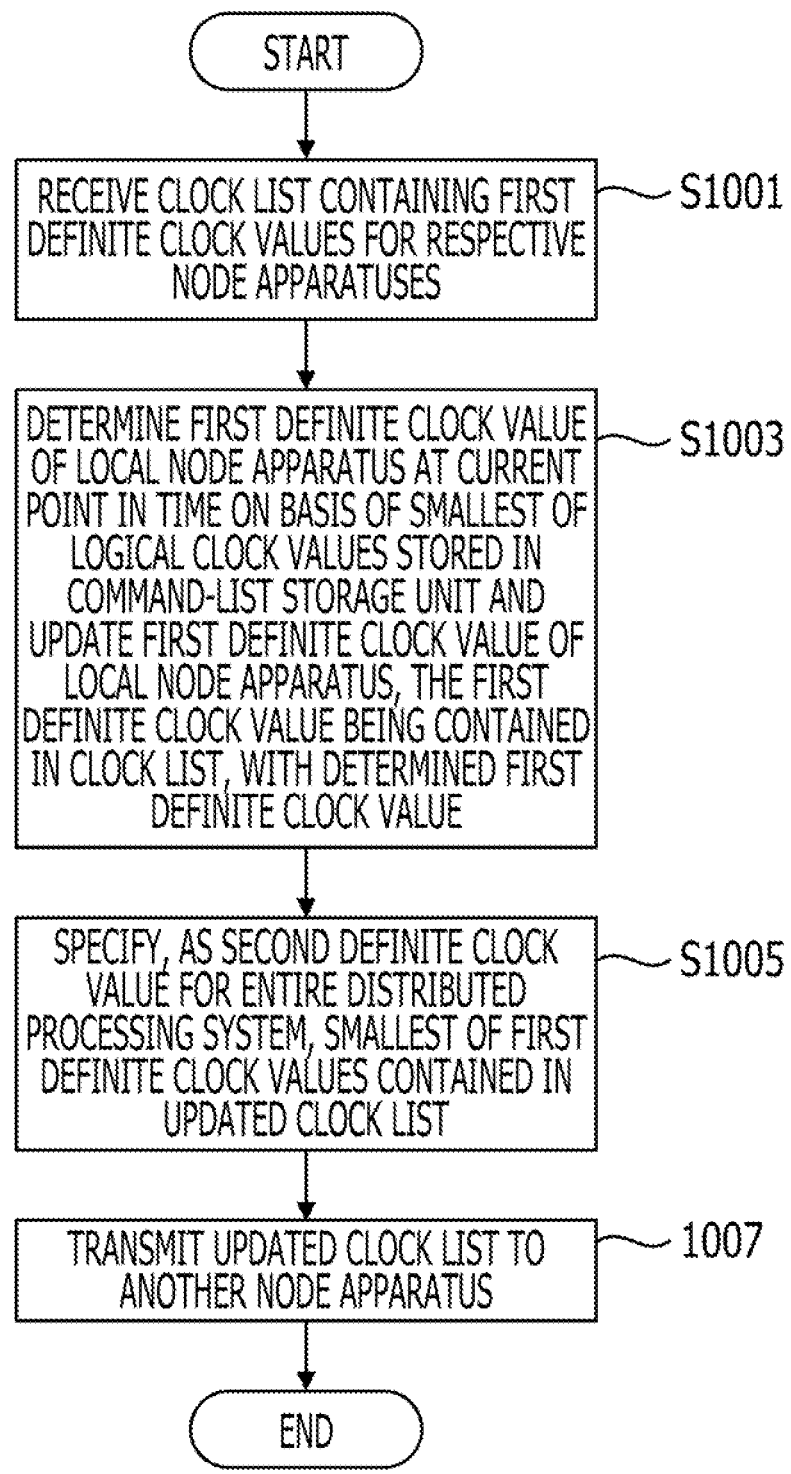
FIG. 6 illustrates an example of a processing flow according to the first embodiment.

Next, details of the processing performed by the node apparatus illustrated in FIG. 5 will be described with reference to FIG. 6. In operation S1001 in FIG. 6, the receiving unit 1501 receives a clock list circulated among the node apparatuses included in the distributed processing system. The clock list contains definite clock values (also referred to as "first definite clock values" hereinafter) for the respective node apparatuses included in the distributed processing system. The clock list received by the receiving unit 1501 is output to the clock-list updating unit 1503.

In operation S1003, the clock-list updating unit 1503 determines the first definite clock value of the local node apparatus at the current point in time on the basis of a smallest of the logical clock values stored in the command-list storage unit 1509 and updates the first definite clock value of the local node apparatus, the first definite clock value being contained in the clock list, with the determined first definite clock value. In such a manner, when the clock list is circulated to the local node apparatus, it reflects the first definite clock value thereof at the current point in time into the clock list. The updated clock list is output to the specifying unit 1505 and the transmitting unit 1507.

In operation S1005, the specifying unit 1505 specifies, as a definite clock value for the entire distributed processing system (hereinafter, this definite clock value may also be referred to as a "second definite clock value" or "entire-system definite clock value"), a smallest of the first definite clock values contained in the updated clock list. In operation S1007, the transmitting unit 1507 transmits the updated clock list to another one of the node apparatuses included in the distributed processing system.

Executing processing as described above makes it possible to specify the entire-system definite clock value for the distributed processing system. Thus, it is possible to keep track of which data has been made definite in the entire distributed processing system.

Second Embodiment

Figure 7:
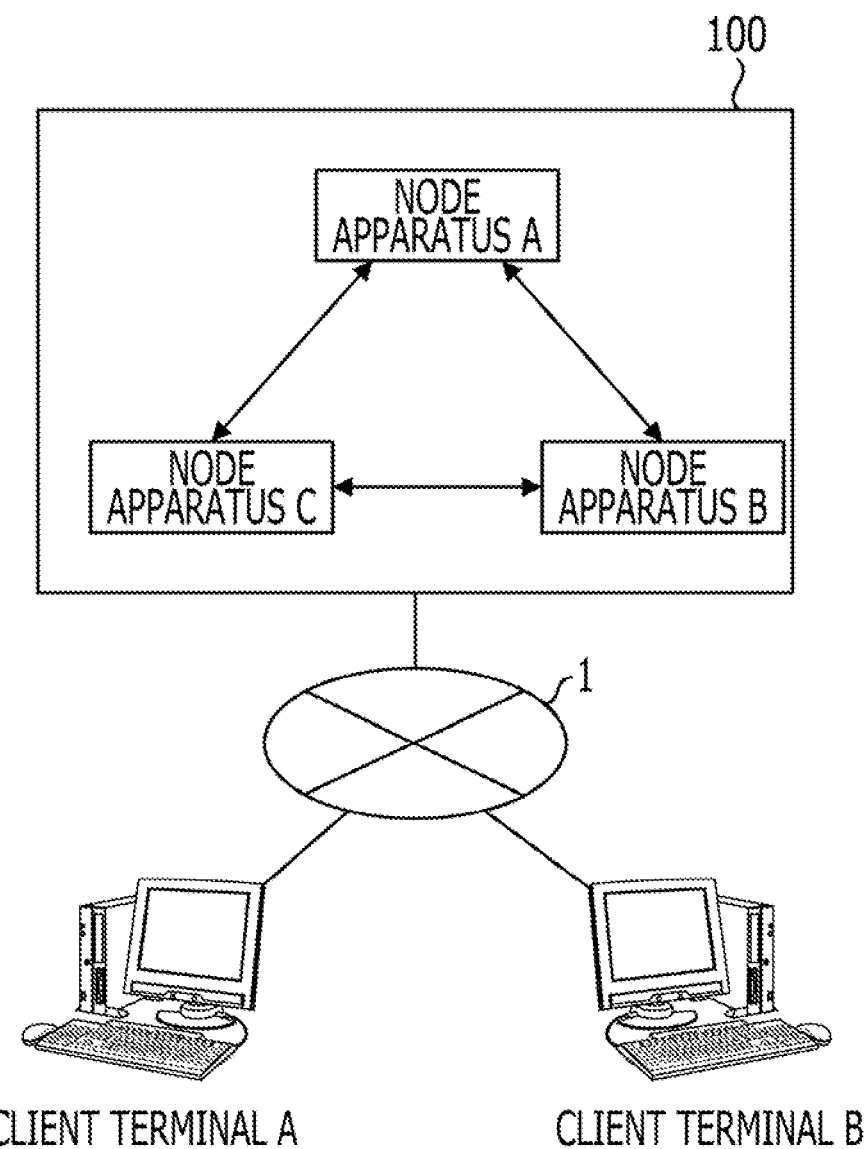
FIG. 7 illustrates an example of a system according to a second embodiment.

A second embodiment will be described next. FIG. 7 is a block diagram of a system according to a second embodiment. A distributed processing system 100 including multiple node apparatuses (node apparatuses A to C in the example of FIG. 7) and multiple client terminals (client terminals A and B in the example of FIG. 7) are connected to a network 1, such as the Internet. Each node apparatus included in the distributed processing system 100 is provided with a framework (not illustrated) for achieving eventual consistency. Each node apparatus may include a database (not illustrated) for storing data transmitted from the client terminals. Although FIG. 7 illustrates an example in which the number of node apparatuses is 3 and the number of client terminals is 2, the number of node apparatuses and the number of client terminals are not limited thereto.

Figure 8:
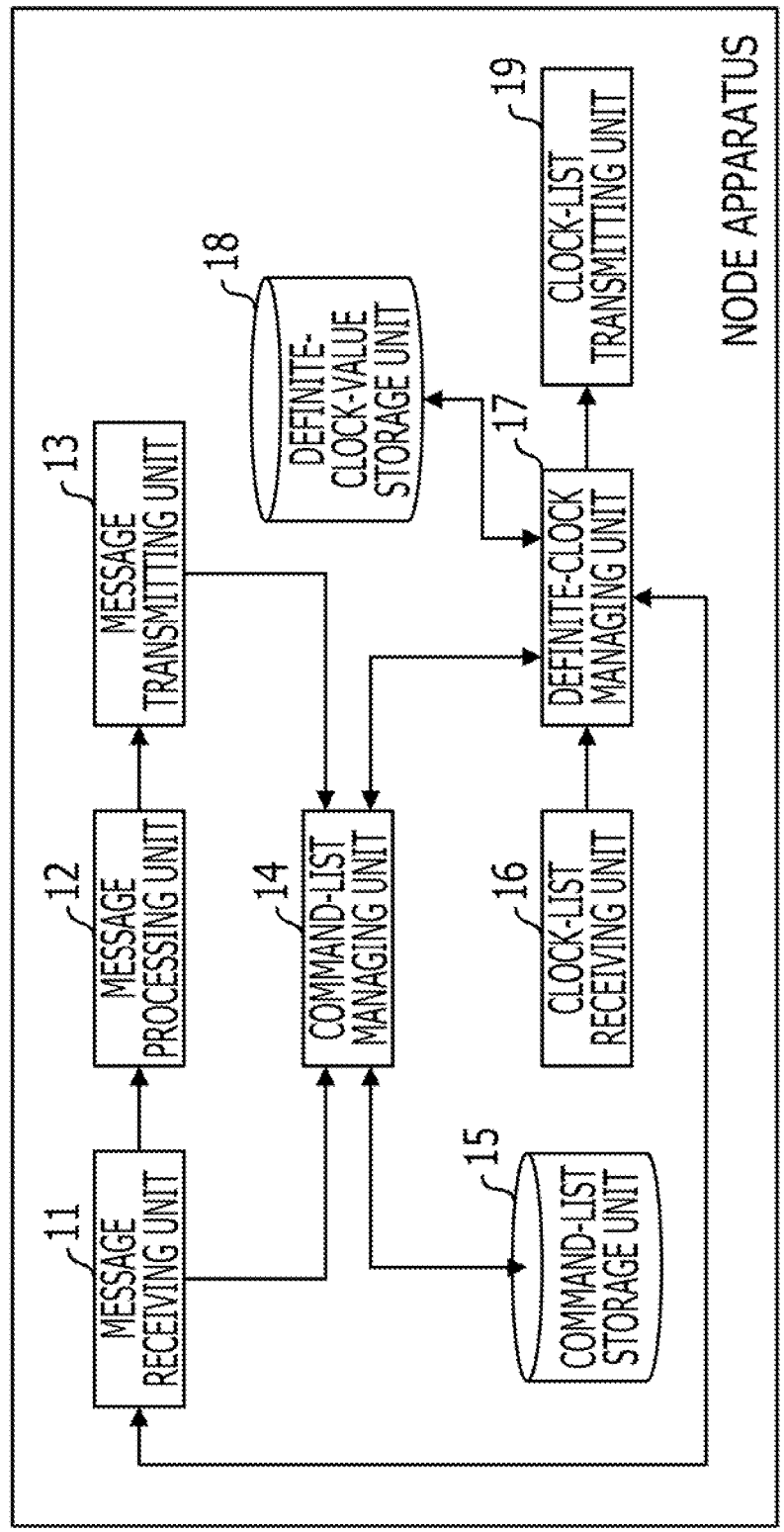
FIG. 8 illustrates an example of a node apparatus according to the second embodiment.

FIG. 8 is a functional block diagram of the node apparatus according to the second embodiment. The node apparatus according to the second embodiment includes a message receiving unit 11, a message processing unit 12, a message transmitting unit 13, a command-list managing unit 14, a command-list storage unit 15, a clock-list receiving unit 16, a definite-clock managing unit 17, a definite-clock-value storage unit 18, and a clock-list transmitting unit 19.

The message receiving unit 11 receives commands from the client terminals and also receives a message from another one of the node apparatuses in the distributed processing system 100. Upon receiving a new command, the message receiving unit 11 sends information of the command to the message processing unit 12, the command-list managing unit 14, or the definite-clock managing unit 17. The message processing unit 12 executes processing corresponding to the command or the message received by the message receiving unit 11. The message transmitting unit 13 transmits a result of the processing performed by the message processing unit 12 to a command request source and/or transmits a message to another one of the node apparatuses in the distributed processing system 100. When the message transmitting unit 13 transmits the processing result and determines that the processing is completed, it issues a notification to that effect to the command-list managing unit 14. The command-list managing unit 14 manages the command-list storage unit 15. In response to notifications from the message receiving unit 11 and the message transmitting unit 13, the command-list managing unit 14 registers and deletes data. In addition, the command-list managing unit 14 performs processing, such as calculating the first definite clock value, by using data stored in the command-list storage unit 15.

The command-list storage unit 15 pre-stores a command list containing a pair of information of the command received by the local node apparatus and the logical clock value obtained at the time of receiving the command. Examples of the command include a set command and a get command. For example, it is assumed that the get command is received when the logical clock value is 10, the set command is received when the logical clock value is 14, and the get command is received when the logical clock value is 16. In this case, when the processing of those commands is not completed yet, data indicating the command list={10: get, 14: set, 16: get} is stored in the command-list storage unit 15.

A value obtained by subtracting 1 from the smallest of the logical clock values contained in the command list is used as the first definite clock value. For example, when the command list noted above is stored in the command-list storage unit 15, the smallest logical clock value contained in the command list is 10 and thus the first definite clock value is 9 (=10−1). When the command list is empty, the logical clock number of the local node apparatus at the current point in time is used as the first definite clock value.

The clock-list receiving unit 16 also receives the clock list from another one of the node apparatuses in the distributed processing system 100. The clock list contains data circulated among the node apparatuses in the distributed processing system 100. The clock list contains a pair of identification information of each node apparatus and the first definite clock value of the node apparatus. For example, when the first definite clock value of the node apparatus A is 10, the first definite clock value of the node apparatus B is 5, and the first definite clock value of the node apparatus C is 7, the clock list is represented by {node A: 10, node B: 5, node C: 7}.

In addition, the definite-clock managing unit 17 uses the processing result of the command-list managing unit 14 to update the clock list received by the clock-list receiving unit 16 and specifies the entire-system definite clock value for the distributed processing system 100 on the basis of the updated clock list. The entire-system definite clock value specified by the definite-clock managing unit 17 is stored in the definite-clock-value storage unit 18. The definite-clock managing unit 17 further determines whether or not the entire-system definite clock value is greater than or equal to a certain logical clock value. When the entire-system definite clock value is greater than or equal to the certain logical clock value, the definite-clock managing unit 17 also performs processing for issuing a notification to that effect to the message receiving unit 11. The clock-list transmitting unit 19 also transmits, to another one of the node apparatuses in the distributed processing system 100, the clock list updated by the definite-clock managing unit 17.

Figure 9A:
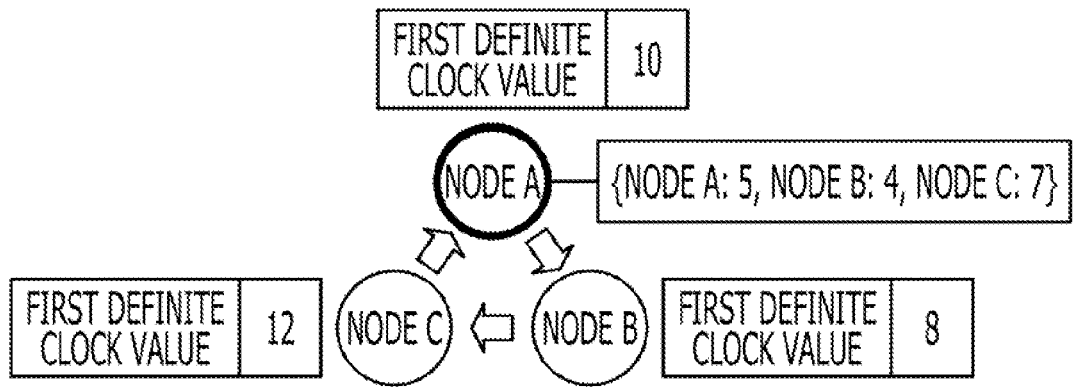
FIGS. 9A to 9C illustrate an example of processing of the entire distributed processing system according to the second embodiment.
Figure 9B:
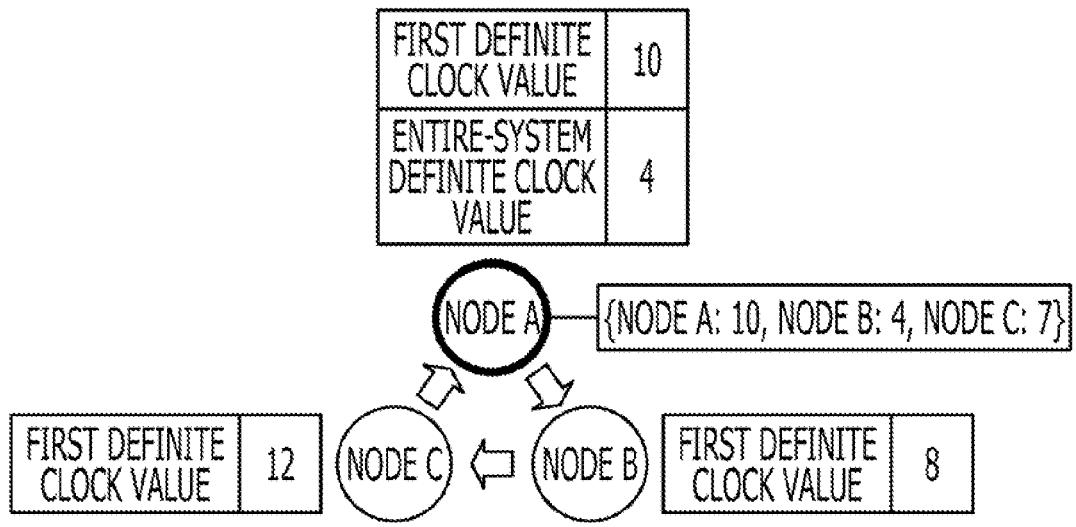

Next, overall processing of the distributed processing system 100 will be described with reference to FIGS. 9A to 10B. Processing of the distributed processing system 100 will now be described in conjunction with an example of a case in which, as illustrated in FIG. 9A, the first definite clock value of the node apparatus A is 10, the first definite clock value of the node apparatus B is 8, and the first definite clock value of the node apparatus C is 12. For example, a node apparatus that generates the clock list during startup of the distributed processing system 100 is predetermined. After the distributed processing system 100 is started normally, when the predetermined node apparatus obtains information (e.g., the total number of node apparatuses and identification information of the node apparatuses) of the node apparatuses in the distributed processing system 100 and generates a clock list, circulation of the clock list is started. In this case, it is assumed that the clock list is circulated in the order of the node apparatus A, the node apparatus B, and the node apparatus C and is then returned to the node apparatus A again. For example, when the clock list={node A: 5, node B: 4, node C: 7} is circuited to the node apparatus A, it updates the clock list in accordance with the first definite clock value (=10) of the node apparatus A. A thick-line circle in FIG. 9A represents the node apparatus having the clock list (the same also applies to a description below). As a result of the update of the clock list, the clock list has the contents of {node A: 10, node B: 4, node C: 7}, as illustrated in FIG. 9B. Thus, the smallest first definite clock value (=4) contained in the updated clock list is specified as the entire-system definite clock value. The specified entire-system definite clock value (=4) is stored in the definite-clock-value storage unit 18 in the node apparatus A. Thereafter, the clock list is transmitted to the node apparatus B.

Figure 9C:
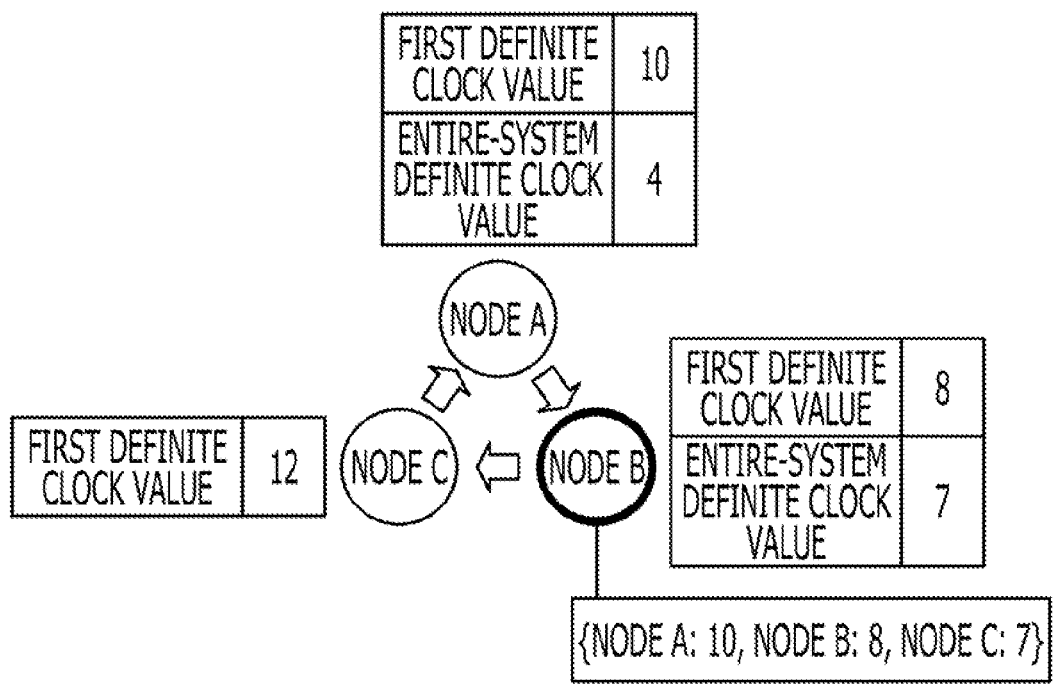

Upon receiving the clock list, the node apparatus B updates the clock list in accordance with the first definite clock value (=8) of the node apparatus B. As a result of the update, the updated clock list has the contents of {node A: 10, node B: 8, node C: 7}, as illustrated in FIG. 9C. Thus, the smallest first definite clock value (=7) contained in the updated clock list is specified as the entire-system definite clock value. The specified entire-system definite clock value (=7) is stored in the definite-clock-value storage unit 18 in the node apparatus B. Thereafter, the clock list is transmitted to the node apparatus C.

Figure 10A:
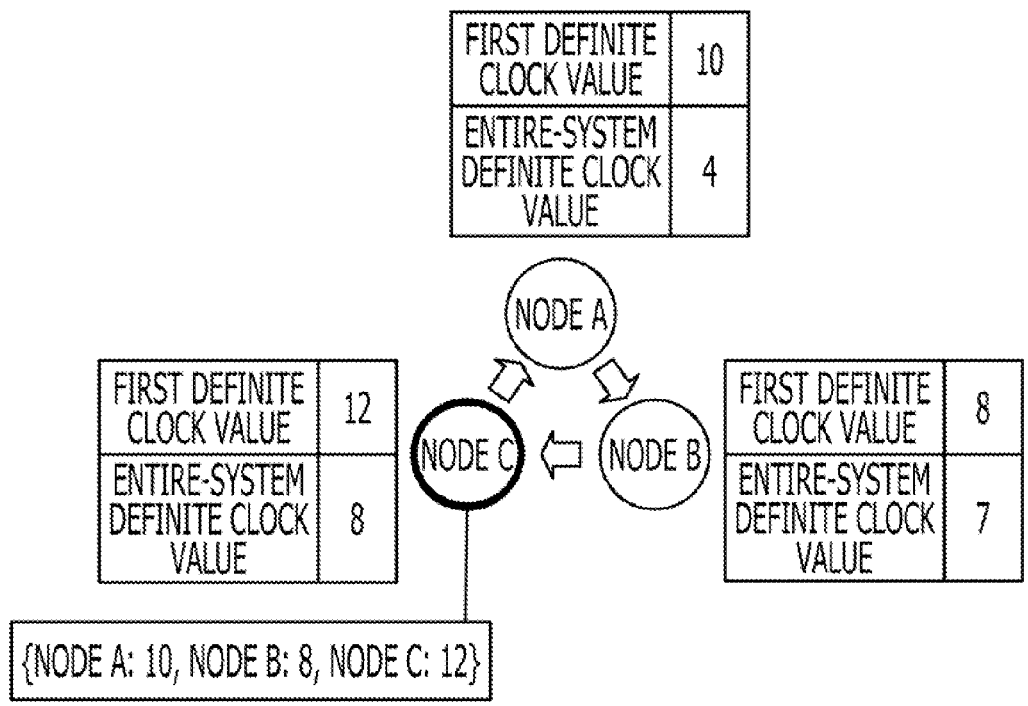
FIGS. 10A and 10B illustrate an example of processing of the entire distributed processing system according to the second embodiment.
Figure 10B:
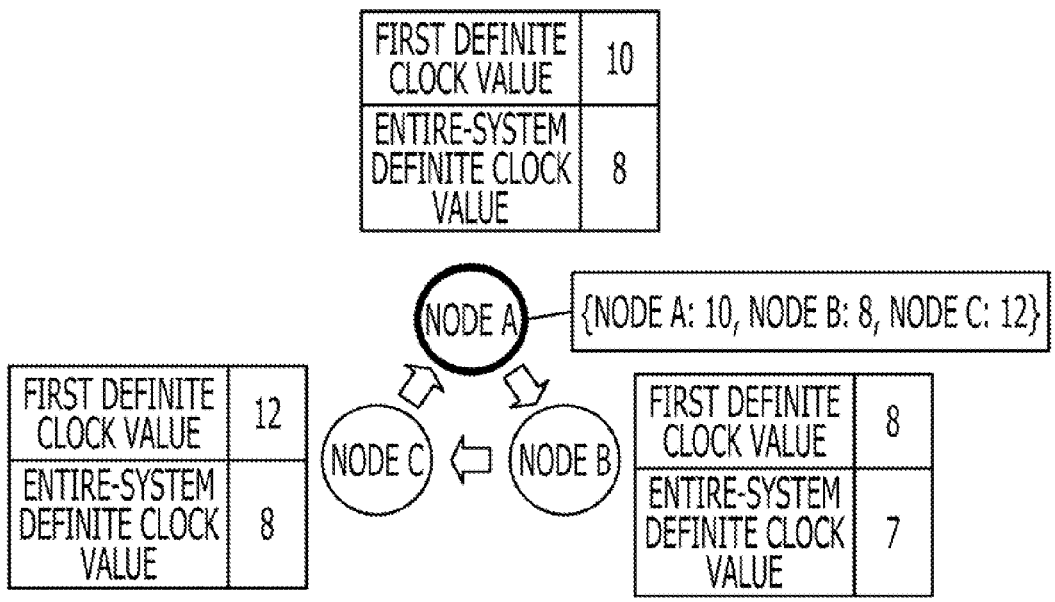

Upon receiving the clock list, the node apparatus C updates the clock list in accordance with the first definite clock value (=12) of the node apparatus C. As a result of the update, the updated clock list has the contents of {node A: 10, node B: 8, node C: 12}, as illustrated in FIG. 10A. Thus, the smallest first definite clock value (=8) contained in the updated clock list is specified as the entire-system definite clock value. The specified entire-system definite clock value (=8) is stored in the definite-clock-value storage unit 18 in the node apparatus C. Thereafter, the clock list is transmitted to the node apparatus A.

Upon receiving the clock list again, the node apparatus A updates the clock list in accordance with the first definite clock value of the node apparatus A. In this case, it is assumed that the first definite clock value of the node apparatus A remains at 10. Thus, the contents of the clock list are the same as the pre-update contents. For example, in such a case, the update processing of the clock list may be omitted. In this case, the smallest first definite clock value (=8) contained in the clock list is specified as the entire-system definite clock value. The specified entire-system definite clock value (=8) is stored in the definite-clock-value storage unit 18 in the node apparatus A.

As described above, when the clock list is circulated to the local node apparatus in the distributed processing system 100, the node apparatus updates the clock list to the latest state and specifies the entire-system definite clock value for the distributed processing system 100. The node apparatus then passes the clock list to the next node apparatus.

Although FIGS. 9A to 10B illustrate an example in which the first definite clock values in the node apparatuses A to C do not change, the first definite clock values also change gradually since command processing is also performed in parallel in the distributed processing system 100. A case in which the first definite clock values change will now be described by way of example with reference to FIG. 11. In the example in FIG. 11, it is assumed that only a node A and a node B exist, for simplicity of description.

Figure 11:
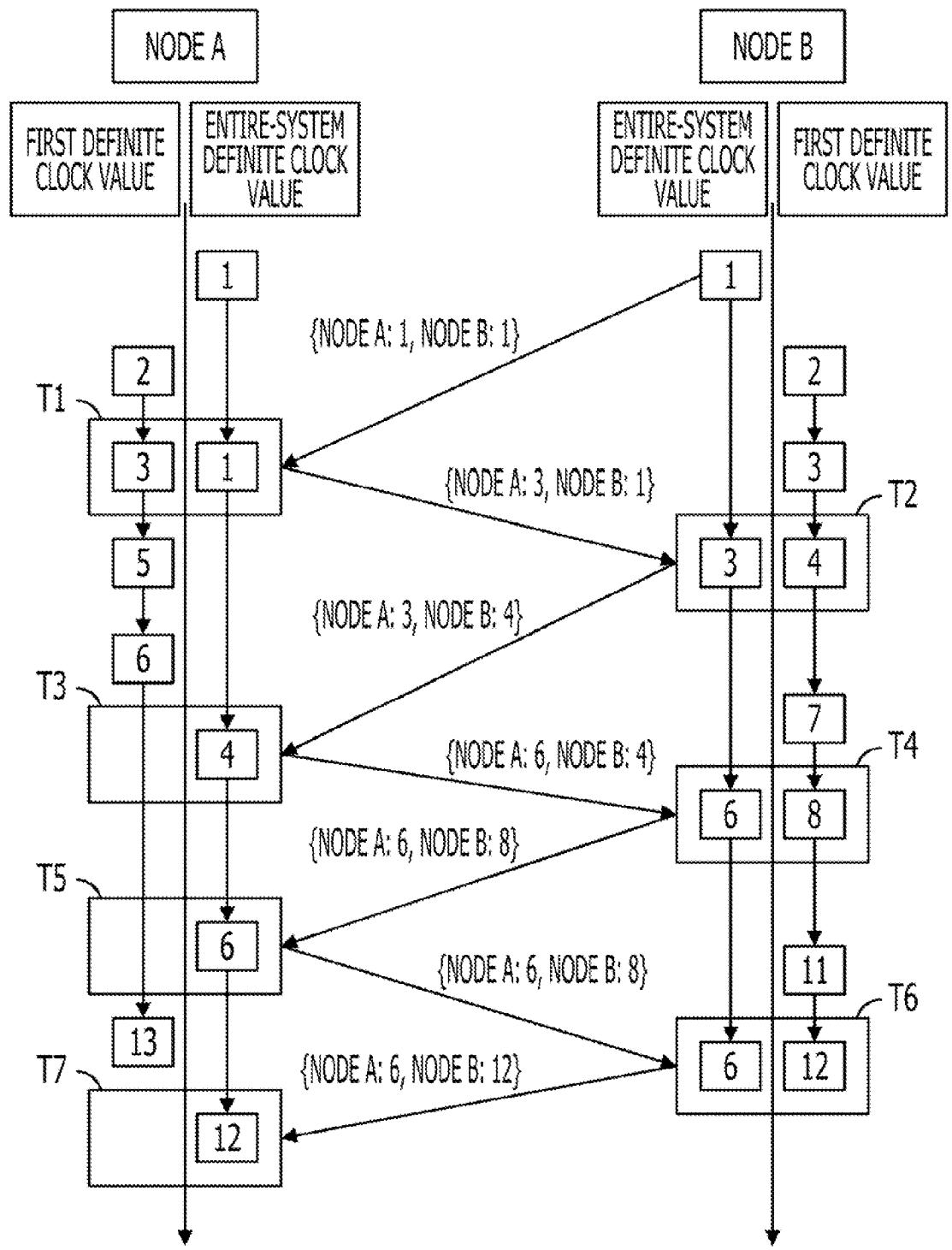
FIG. 11 illustrates an example of a sequence of operations of node apparatuses.

First, at T1 in FIG. 11, the node apparatus A receives a clock list={node A: 1, node B: 1} from the node apparatus B. In this case, the first definite clock value of the node apparatus A is 3, and thus the node apparatus A updates the clock list to a clock list={node A: 3, node B: 1}. As a result, the first definite clock value (=1) of the node apparatus B becomes the smallest of the first definite clock values in the clock list. Thus, at the stage of T1, "1" is specified as the entire-system definite clock value. The clock list is then transmitted from the node apparatus A to the node apparatus B.

Thereafter, at T2 in FIG. 11, the node apparatus B receives the clock list={node A: 3, node B: 1} from the node apparatus A. In this case, the first definite clock value of the node apparatus B is 4, and thus, the node apparatus B updates the clock list to a clock list={node A: 3, node B: 4}. As a result, the first definite clock value (=3) of the node apparatus A becomes the smallest of the first definite clock values in the clock list. Thus, at the stage of T2, "3" is specified as the entire-system definite clock value. The clock list is then transmitted from the node apparatus B to the node apparatus A.

At T3 in FIG. 11, the node apparatus A receives the clock list={node A: 3, node B: 4} from the node apparatus B. In this case, since the first definite clock value of the node apparatus A has increased to 6, the node apparatus A updates the clock list to a clock list={node A: 6, node B: 4}. As a result, the first definite clock value (=4) of the node apparatus B becomes the smallest of the first definite clock values in the clock list. Thus, at the stage of T3, "4" is specified as the entire-system definite clock value. The clock list is transmitted from the node apparatus A to the node apparatus B.

At T4 in FIG. 11, the node apparatus B receives the clock list={node A: 6, node B: 4} from the node A. In this case, since the first definite clock value of the node apparatus B has increased to 8, the node apparatus B updates the clock list to a clock list={node A: 6, node B: 8}. As a result, the first definite clock value (=6) of the node apparatus A becomes the smallest of the first definite clock values in the clock list. Thus, at the stage of T4, "6" is specified as the entire-system definite clock value. The clock list is then transmitted from the node apparatus B to the node apparatus A.

At T5 in FIG. 11, the node apparatus A receives the clock list={node A: 6, node B: 8} from the node apparatus B. At this point, since the first definite clock value of the node apparatus A remains at 6, the contents of the clock list do not change. However, although the smallest first definite clock value at the stage of T3 was 4, the smallest first definite clock value at the stage of T5 has changed to 6 since the clock list was updated by the node apparatus B at the stage of T4. Thus, at the stage of T5, "6" is specified as the entire-system definite clock value. The clock list is transmitted from the node apparatus A to the node apparatus B.

At T6 in FIG. 11, the node apparatus B receives the clock list={node A: 6, node B: 8} from the node A. In this case, since the first definite clock value of the node apparatus B has increased to 12, the node apparatus B updates the clock list to a clock list={node A: 6, node B: 12}. At the stage of T6, since the smallest first definite clock value (=6) has not changed from the value at T4, the entire-system definite clock value remains at 6. The clock list is transmitted from the node apparatus B to the node apparatus A.

At T7 in FIG. 11, the node apparatus A receives the clock list={node A: 6, node B: 12} from the node apparatus B. In this case, since the first definite clock value of the node apparatus A has increased to 13, the node apparatus A updates the clock list to a clock list={node A: 13, node B: 12}. As a result, the first definite clock value (=12) of the node apparatus B becomes the smallest of the first definite clock values in the clock list. Thus, at the stage of T7, "12" is specified as the entire-system definite clock value.

As described above, the entire-system definite clock value also changes so as to correspond to a change in the first definite clock values. Although FIG. 11 illustrates an example in which only two node apparatuses A and B exist, the processing of each node apparatus is substantially the same when three or more node apparatuses exist.

Executing processing as described above makes it possible to specify the entire-system definite clock value for the distributed processing system 100. Thus, it is possible to keep track of which data has been made definite in the entire distributed processing system 100.

Figure 12:
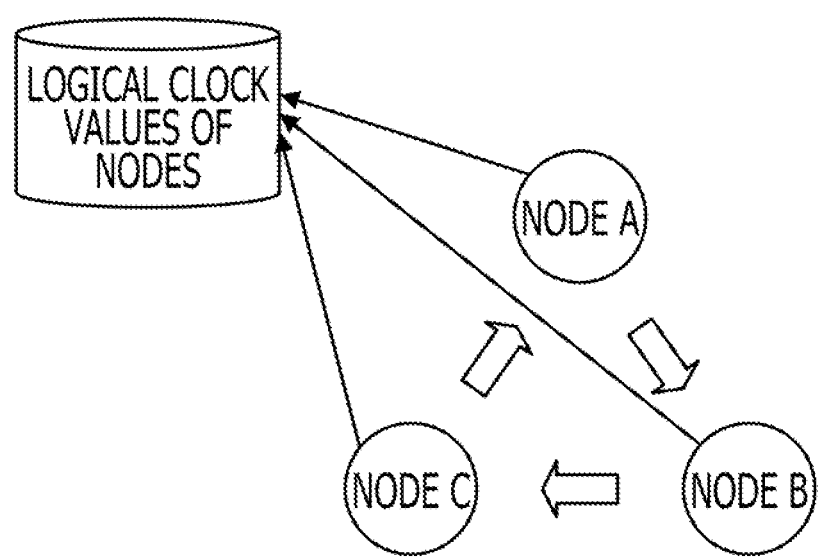
FIG. 12 illustrates one example of another scheme for keeping track of an entire-system definite clock value.

A scheme as illustrated in FIG. 12 is also conceivable as a scheme for keeping track of the entire-system definite clock value. Specifically, a database to which all of the node apparatuses in the distributed processing system 100 can perform writing is provided and each node apparatus performs writing to the database each time the logical clock value of the local node apparatus is updated. In this scheme, however, access to the database occurs each time the logical clock value is updated and the amount of load other than the load of processing to be essentially performed increases. When multiple node apparatuses are to access the single database, exclusive control is necessary and the latency or the like occurs. In contrast, the scheme according to the present embodiment makes it possible to keep track of the entire-system definite clock value while reducing the amount of load of processing to be essentially performed.

A processing flow of the node apparatus according to the second embodiment will be described next. A processing flow upon reception of a command will first be described with reference to FIG. 13. For example, in operation S1 in FIG. 13, the message receiving unit 11 receives a new command from the client terminal. Upon reception of the command, a logical clock value at the time of receiving it is specified. The message receiving unit 11 issues, to the message processing unit 12 and the command-list managing unit 14, a notification indicating command information including the type of command, the logical clock value obtained at the time of receiving the command, and so on.

Upon receiving the command information from the message receiving unit 11, in operation S3, the command-list managing unit 14 registers, in the command list, a pair of the command and the logical clock value obtained at the time of receiving the command. That is, each time a command is received, a pair of the command and the logical clock value obtained at the time of receiving the command is registered in the command list.

Upon receiving the command information from the message receiving unit 11, the message processing unit 12 executes processing corresponding to the received command. Thereafter, the processing ends. Since an operation of the message processing unit 12 is substantially the same of a known operation, a description thereof is not given hereinafter.

A processing flow when command processing is completed will be described next with reference to FIG. 14. For example, in operation S11 in FIG. 14, the command-list managing unit 14 searches the command list, stored in the command-list storage unit 15, to determine whether or not a command or commands being processed exist therein. For example, when the command list is empty, it is determined that a command being processed does not exist, and when even one pair of a command and a logical clock value obtained at the time of receiving the command is registered in the command list, it is determined that a command being processed exists. When the command list is empty, i.e., when it is determined that a command being processed does not exist (No in operation S11), the processing ends.

On the other hand, when it is determined that a command or commands being processed exist (Yes in operation S11), the process proceeds to operation S13 in which the command-list managing unit 14 determines whether or not the processing of any of the command(s) is completed. For example, when the message processing unit 12 executes processing corresponding to a command in parallel with the processing flow in FIG. 14 and completes the processing, a processing completion notification is sent to the command-list managing unit 14. Upon receiving the processing completion notification, the command-list managing unit 14 determines that the processing is completed. When the command-list managing unit 14 has not received the processing completion notification (No in operation S13), it waits until receiving the processing completion notification.

It is determined that processing of any of the command(s) is completed (Yes in operation S13), the process proceeds to operation S15 in which the command-list managing unit 14 deletes, from the command list in the command-list storage unit 15, data of the pair of the command on which the processing is completed and the logical clock value obtained at the time of receiving the command.

When the message processing unit 12 completes the processing, the process proceeds to operation S17 in which the message transmitting unit 13 transmits a result of the processing to the command request source. Thereafter, the process returns to the processing in operation S11, and the above-described processing is repeated until the command list becomes empty. In the processing flow illustrated in FIG. 14, the order of operations S15 and S17 may be changed and they may also be performed in parallel.

Figure 13:
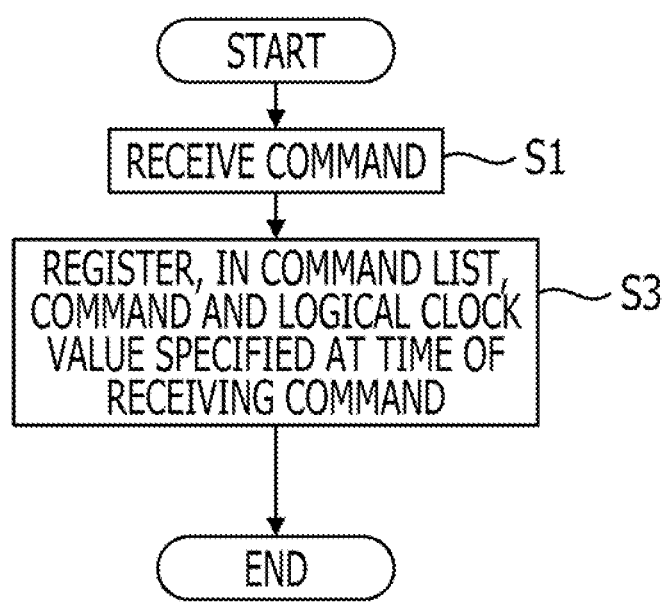
FIG. 13 illustrates an example of a processing flow of the node apparatus upon reception of a command.
Figure 14:
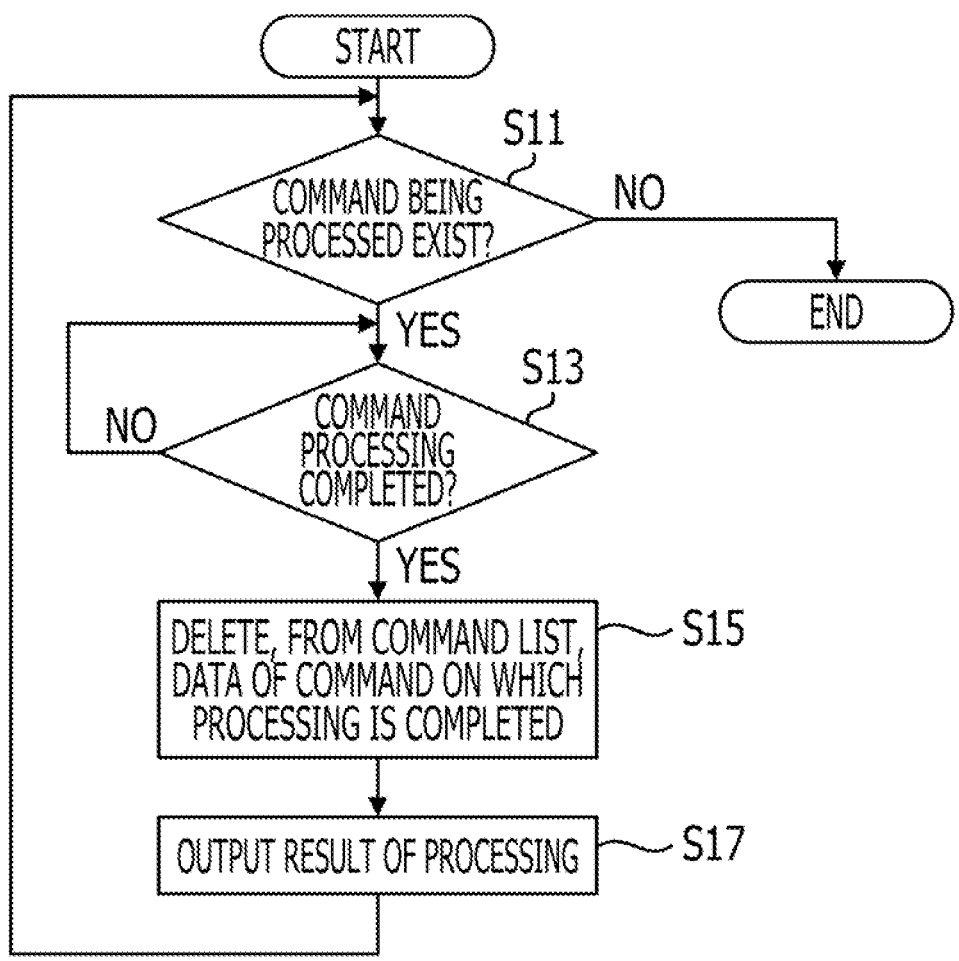
FIG. 14 illustrates an example of a processing flow of the node apparatus upon completion of command processing.

Executing processing as illustrated in FIGS. 13 and 14 makes it possible to appropriately manage information of a command being processed.

Figure 15:
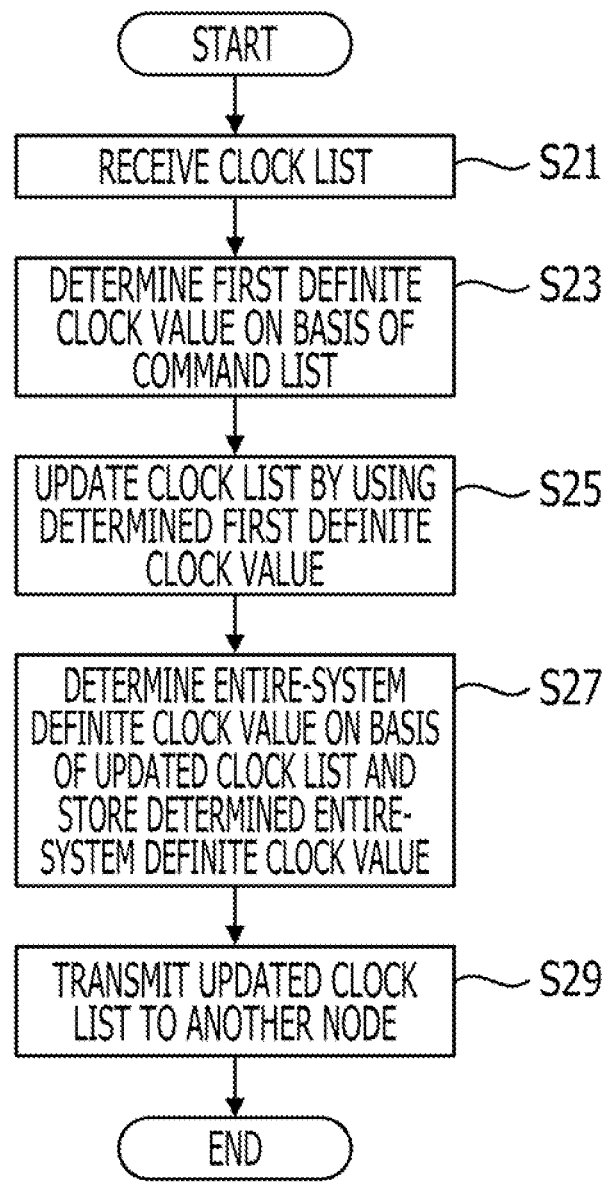
FIG. 15 illustrates an example of a processing flow of the node apparatus upon reception of a clock list.

A processing flow upon reception of the clock list will be described next with reference to FIG. 15. First, in operation S21 in FIG. 15, the clock-list receiving unit 16 receives the clock list from another one of the node apparatuses in the distributed processing system 100. The clock-list receiving unit 16 outputs the received clock list to the definite-clock managing unit 17.

The definite-clock managing unit 17 receives the clock list from the clock-list receiving unit 16 and then issues, to the command-list managing unit 14, an instruction for determining the first definite clock value of the local node apparatus at the current point in time. In response to the instruction from the definite-clock managing unit 17, in operation S23, the command-list managing unit 14 determines the first definite clock value at the current point in time, on the basis of the command list stored in the command-list storage unit 15. For example, the command-list managing unit 14 determines, as the first definite clock value at the current point in time, a value obtained by subtracting 1 from the smallest of the logical clock values contained in the command list. Since the logical clock value has a characteristic of just increasing, the definite logical value can be regarded as being defined up to the value that is smaller by 1 than the minimum logical clock value contained in the command list. For example, when the smallest logical clock value contained in the command list is 10, 9 (=10−1) is determined as the first definite clock value. The command list may be empty when all processing is completed. When the command list is empty, the logical clock value at the current point in time is determined as the first definite clock value. For example, as described in Background hereinabove, each node apparatus performs processing while changing the logical clock value. That is, even when the command list is empty, the logical clock value changes since each node apparatus receives a message from another node apparatus. Accordingly, when the command list is empty, the logical clock value at the current point in time is used as the first definite clock value.

After the first definition clock value is determined as described above, the command-list managing unit 14 outputs the first definite clock value to the definite-clock managing unit 17. When the definite-clock managing unit 17 receives the first definite clock value from the command-list managing unit 14, the process proceeds to operation S25 in which the definite-clock managing unit 17 updates the clock list by using the first definite clock value. That is, the first definite clock value of the local node apparatus, the first definite clock apparatus being contained in the clock list, is updated with the first definite clock value determined in operation S23.

Subsequently, in operation S27, the definite-clock managing unit 17 specifies the entire-system definite clock value on the basis of the updated clock list and stores the specified entire-system definite clock value in the definite-clock-value storage unit 18. More specifically, the definite-clock managing unit 17 specifies, as the entire-system definite clock value, the smallest of the first definite clock values contained in the updated clock list.

The definite-clock managing unit 17 then issues, to the clock-list transmitting unit 19, an instruction for transmitting the updated clock list. In response to the instruction from the definite-clock managing unit 17, in operation S29, the clock-list transmitting unit 19 transmits the updated clock list to a next one of the node apparatuses in the distributed processing system 100. For example, the order in which the clock list is circulated may be predetermined (e.g., in ascending or descending order of the node identification numbers) or may be random. For example, the arrangement may also be such that the node apparatus whose first definite clock value is the smallest of those of the other node apparatuses in the distributed processing system 100 is identified and the clock list is transmitted to the identified node apparatus. As described above, the entire-system definite clock value is the smallest of the first definite clock values contained in the clock list. Thus, when the system is adapted such that the clock list is first circulated to the node apparatus whose first definite clock value is the smallest, the entire-system definite clock value is reflected immediately upon update of the first definite clock value of that node apparatus. After operation S29, the processing ends.

Executing processing as described above makes it possible to specify the entire-system definite clock value for the distributed processing system 100.

Figure 16:
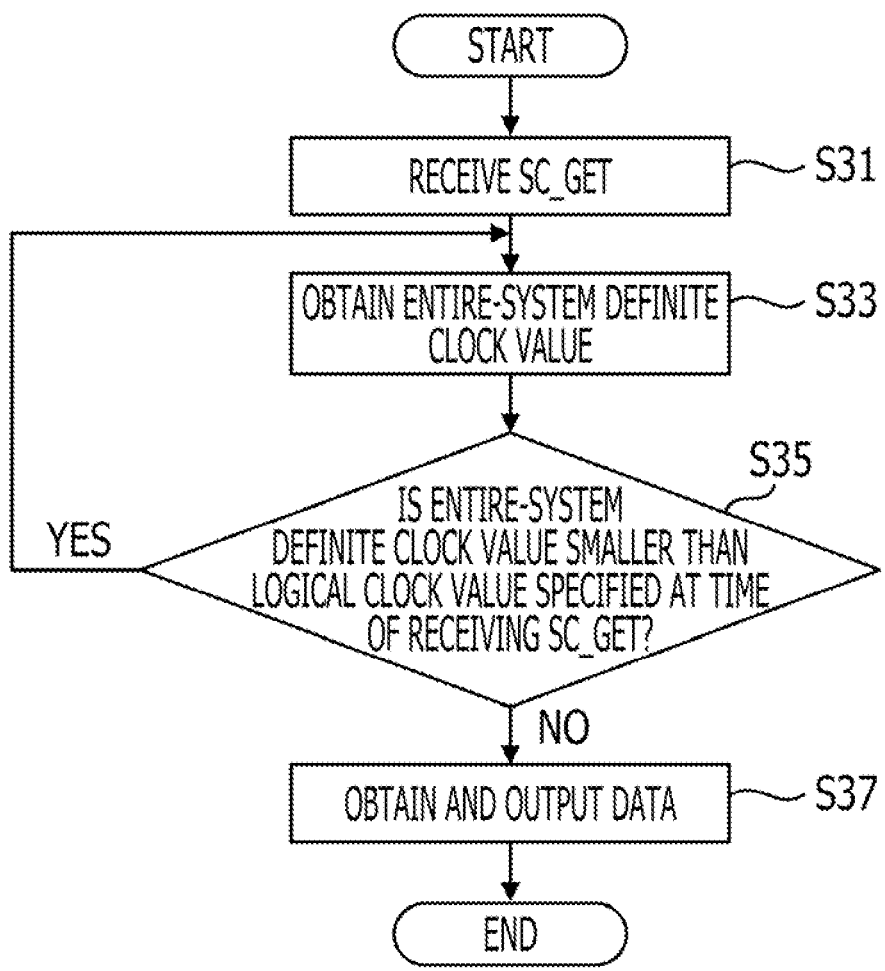
FIG. 16 illustrates an example of a processing flow of the node apparatus upon reception of an strict_get command.

A processing flow upon reception of a strict_get command will be described next with reference to FIG. 16. The processing illustrated in FIG. 16 is assumed to be performed in parallel with the processing illustrated in FIG. 15. First in operation S31 in FIG. 16, the message receiving unit 11 receives a strict_get command from the client terminal. In this case, the message receiving unit 11 specifies a logical clock value at the time of receiving the strict_get command. The message receiving unit 11 then sends, to the definite-clock managing unit 17, a notification indicating the logical clock value obtained at the time of receiving the strict_get command. It is assumed that the strict_get command is not registered in the command list.

The definite-clock managing unit 17 receives, from the message receiving unit 11, the logical clock value obtained at the time of receiving the strict_get command. In operation S33, the definite-clock managing unit 17 obtains the entire-system definite clock value from the definite-clock-value storage unit 18. In operation S35, the definite-clock managing unit 17 determines whether or not the entire-system definite clock value is smaller than the logical clock value obtained at the time of receiving the strict_get command. When the entire-system definite clock value is smaller than the logical clock value obtained at the time of receiving the strict_get command (Yes in operation S35), the definite-clock managing unit 17 temporarily suspends the processing until the entire-system definite clock value is updated by the processing illustrated in FIG. 15. When the entire-system definite clock value is updated, the process returns to operation S33 and the processing is resumed. The processing in operations S33 and S35 is repeated until the entire-system definite clock value is greater than or equal to the logical clock value obtained at the time of receiving the strict_get command.

When it is determined that the entire-system definite clock value is greater than or equal to the logical clock value obtained at the time of receiving the strict_get command (No in operation S35), the definite-clock managing unit 17 issues a notification to that effect to the message receiving unit 11. Upon receiving the notification from the definite-clock managing unit 17, the message receiving unit 11 issues, to the message processing unit 12, an instruction for executing processing for the strict_get command. In operation S37, the message processing unit 12 obtains, from the database in the local node apparatus, data, specified by the strict_get command and causes the message transmitting unit 13 to transmit the obtained data. The message transmitting unit 13 transmits the data to the request source of the strict_get command. Thereafter, the processing ends.

For example, when it is assumed that the logical clock value obtained at the time of receiving the strict_get command is 5 and the entire-system definite clock value at the time thereof is 4, there is a possibility that the data can be overwritten by a command received when the logical clock value is 5. Accordingly, in the present embodiment, the system is adapted to obtain data when the entire-system definite clock value is greater than or equal to the logical clock value obtained at the time of receiving the strict_get command, as described above. With this arrangement, it is possible to obtain consistent data corresponding to the logical clock value obtained at the time of receiving the strict_get command. The present technology can also be applied to, for example, generation of a snapshot of a database.

Although an example in which the consistent data is obtained based on the logical clock value obtained at the time of receiving the strict_get command has been described above, the system may be configured so that when the consistent data is to be obtained is specified according to the strict_get command. In such a case, the logical clock value specified by the strict_get command, rather than the logical clock value obtained at the time of receiving the strict_get command, may be used to execute processing as described above.

Figure 17:
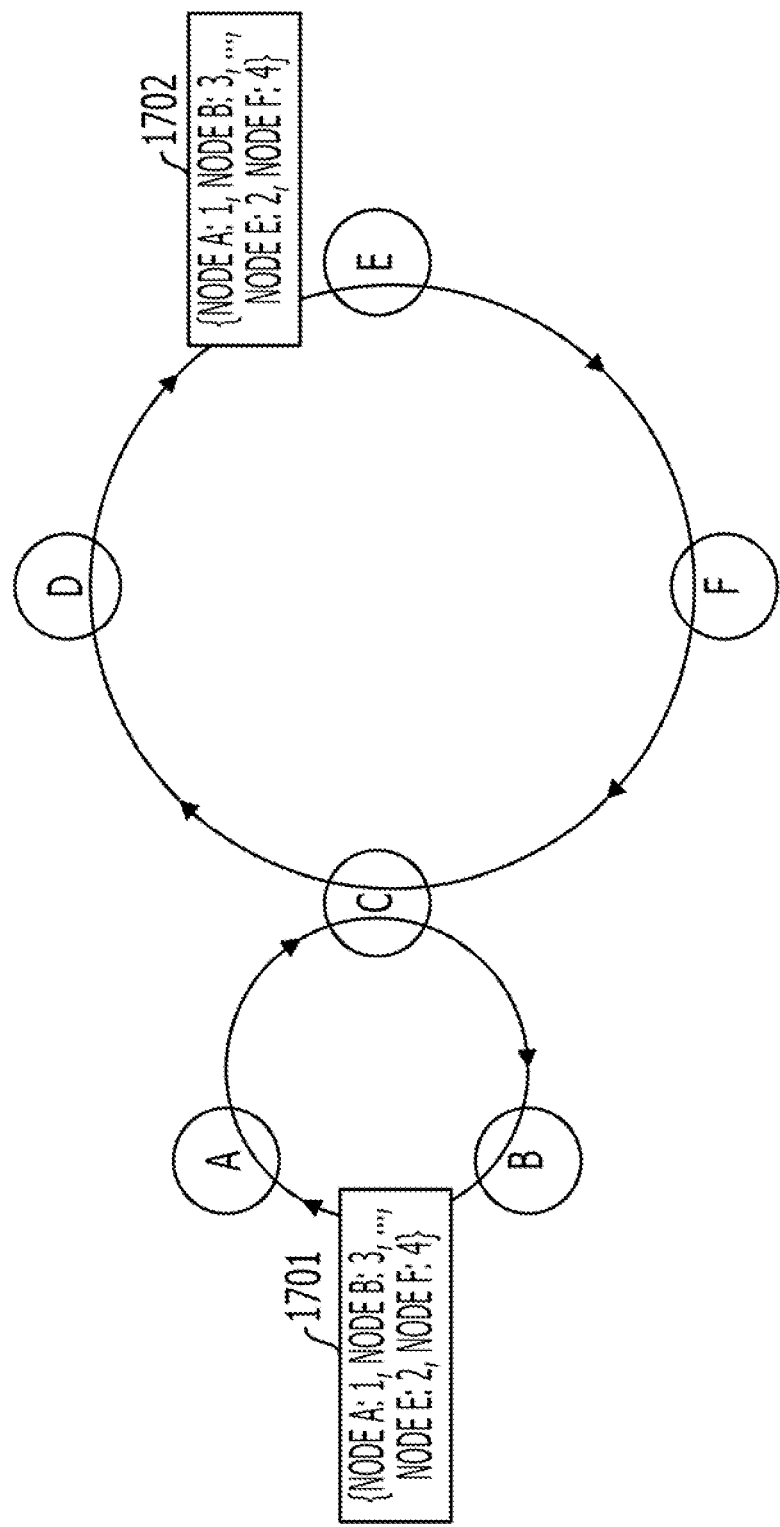
FIG. 17 illustrates a first example of how clock lists are circulated.
Figure 18:
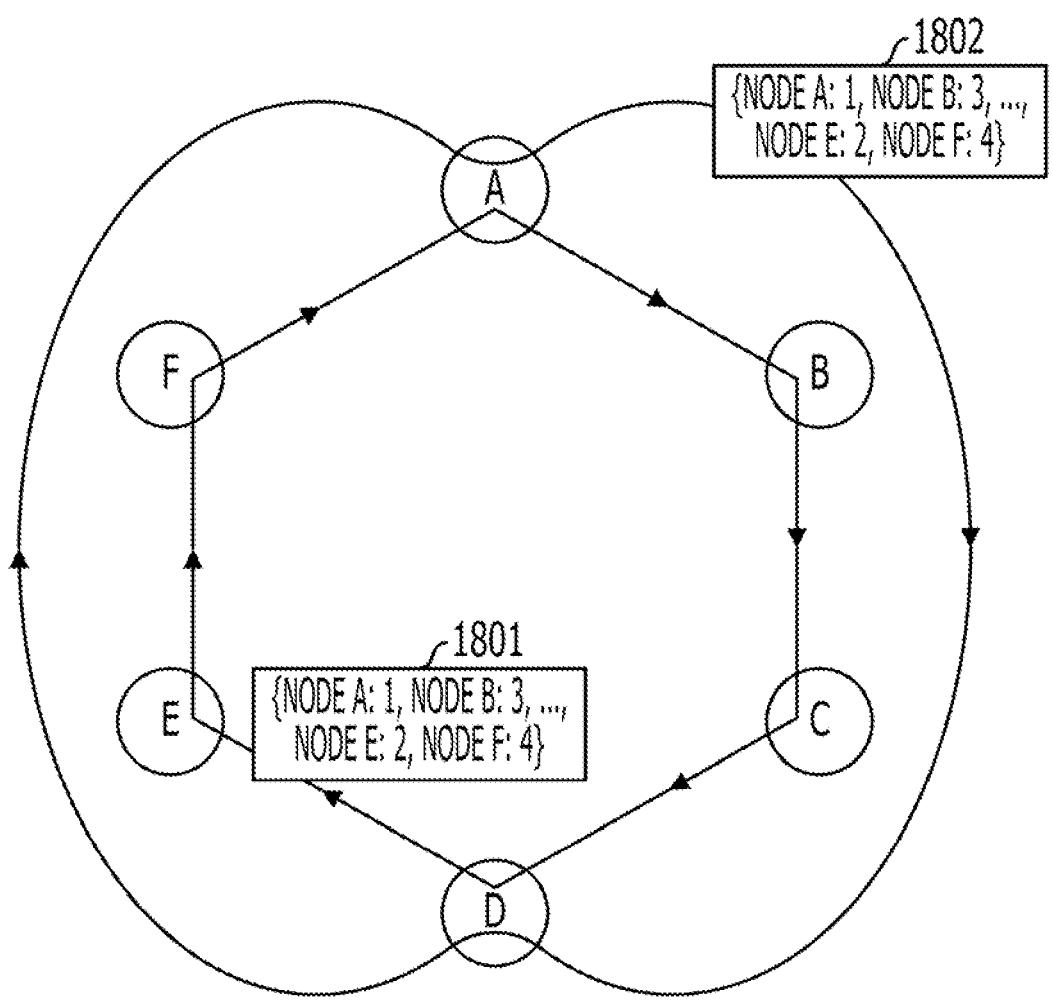
FIG. 18 illustrates a second example of how clock lists are circulated.

The number of clock lists is not limited to one and multiple clock lists may be circulated. For example, when the number of clock lists is increased, the interval of the clock list reception is reduced and thus the interval of execution of the processing illustrated in FIG. 15 is also reduced. This makes it possible to more frequently keep track of the entire-system definite clock value. In addition, the circulation of multiple clock lists may be performed in any way. FIGS. 17 and 18 illustrate examples of the way in which multiple clock lists are circulated.

In the example of FIG. 17, a first clock list 1701 is circulated among a node A, a node B, and a node C and a second clock list 1702 is circulated among the node C, a node D, a node E, and a node F. Each of the clock lists 1701 and 1702 contains the first definite clock values of all of the nodes (i.e., the nodes A to F). In this example, however, the clock list 1702 is not passed to the nodes A and B and the clock list 1701 is not passed to the nodes D to F. Accordingly, the node C that receives both of the clock lists 1701 and 1702 executes processing as described below. That is, the node C stores the most recently received clock lists 1701 and 1702. Upon receiving a new clock list 1701, the node C reflects its own first definite clock value in the clock list 1701, extracts the first definite clock values of the nodes D to F from the pre-stored clock list 1702, and reflects the extracted first definite clock values in the clock list 1701. Upon receiving a new clock list 1702, the node C reflects its own first definite clock value in the clock list 1702, extracts the first definite clock values of the nodes A and B from the pre-stored clock list 1701, and reflects the extracted first definite clock values in the clock list 1702. With this arrangement, for example, although the clock list 1701 is not passed to the nodes D to F, the first definite clock values of the nodes D to F, the first definite clock values being contained in the clock list 1701, can be appropriately updated. Similarly, although the clock list 1702 is not passed to the nodes A and B, the first definite clock values of the nodes A and B, the first definite clock values being contained in the clock list 1702, can be appropriately updated.

In the example of FIG. 18, a first clock list 1801 is circulated among all nodes (i.e., nodes A to F) and a second clock list 1802 is circulated between the node A and the node D. Each of the clock lists 1801 and 1802 contains the first definite clock values of all the nodes (i.e., the nodes A to F). For example, the arrangement may be such that at least one clock list is circulated to nodes that do not frequently receive commands and multiple clock lists are circulated to nodes that frequently receive commands.

When multiple clock lists are circulated, a difference may arise between the clock lists. In such a case, the arrangement may be such that one node synchronizes the clock lists with the latest contents periodically or at a predetermined timing and then resumes the circulation of the clock lists.

Although the embodiments of the present invention have been described above, the present invention is not limited thereto. For example, the functional block diagrams of the node apparatuses illustrated in FIGS. 5 and 8 are examples and do not necessarily match the actual program module configuration in some cases. Similarly, the structure of the data storage unit is merely one example.

In the processing flows, the order of the processing may also be changed as long as the result of the processing is substantially the same. In addition, the processing may be performed in parallel.

Figure 19:
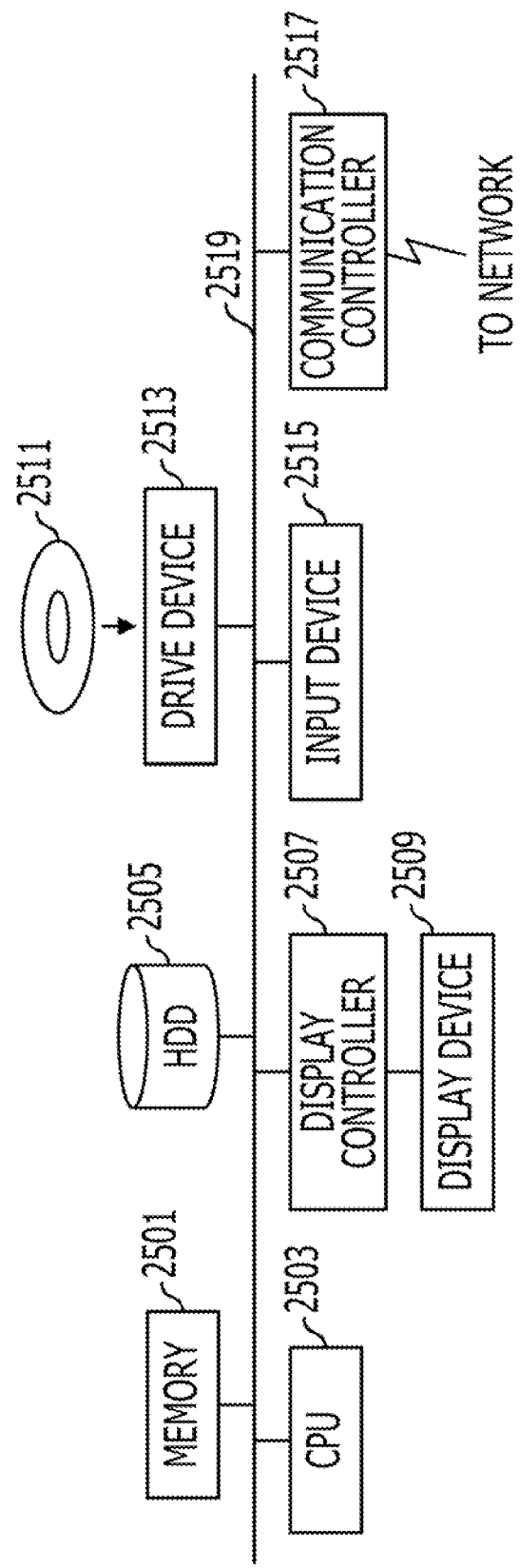
FIG. 19 illustrates an example of a computer.

The above-described node apparatus may be realized by a computer apparatus. For example, as illustrated in FIG. 19, the node apparatus may be realized a computer having a configuration in which a memory 2501, a processor (CPU (central processing unit)) 2503, a hard disk drive (HDD) 2505, a display controller 2507 coupled to a display device 2509, a drive device 2513 for a computer-readable removable disk 2511, an input device 2515, and a communication controller 2517 for connection with a network are coupled through a bus 2519. An operating system (OS) and an application program for performing the processing in the above-described embodiment may be stored on a storage unit, such as the HDD 2505. When the OS and the application program are to be executed by the CPU 2503, they may be read from the HDD 2505 to the memory 2501. The CPU 2503 may control the display controller 2507, the communication controller 2517, and the drive device 2513 so as to perform necessary operations, as needed. Data during processing may also be stored in the memory 2501 and, if necessary, may be stored on the HDD 2505. In the embodiment, the application program for performing the above-described processing may be stored on the computer-readable removable disk 2511, be distributed, and be then installed from the drive device 2513 to the HDD 2505. The application program may also be installed to the HDD 2505 through a network, such as the Internet, and the communication controller 2517. In such a computer apparatus, hardware such as the CPU 2503 and the memory 2501, the OS, and the necessary application program organically cooperate with each other to realize various functions as described above. The command-list storage unit 1509 in FIG. 5 may be realized as the memory 2501, the HDD 2505, or the like in FIG. 19. The same applies to the command-list storage unit 15 and the definite-clock-value storage unit 18 in FIG. 8. The receiving unit 1501, the clock-list updating unit 1503, the specifying unit 1505, and the transmitting unit 1507 in FIG. 5 may be realized by a combination of the CPU 2503 and the program, i.e., by the CPU 2503 executing the program. More specifically, the CPU 2503 may function as a processing unit as described above by performing an operation according to the program stored on the HDD 2505 or in the memory 2501. The same applies to the message receiving unit 11, the message processing unit 12, the message transmitting unit 13, the command-list managing unit 14, the clock-list receiving unit 16, the definite-clock managing unit 17, and the clock-list transmitting unit 19 in FIG. 8.

A definite-clock determination according to an embodiment may relate to a method executed by node apparatuses included in a distributed processing system. The method includes: (A) receiving a clock list containing first definite clock values of the respective node apparatuses, the clock list being circulated among the node apparatuses: (B) determining the first definite clock value of the first node apparatus at a current point in time on a basis of a smallest of logical clock values with respect to corresponding commands on which processing is not completed, the commands being included in commands received by the first node apparatus and the logical clock values being obtained at a time of receiving the corresponding commands and being stored in a command-list storage unit, and updating the first definite clock value of the first node apparatus, the first definite clock value being included in the clock list, by using the determined first definite clock value; (C) specifying, as a second definite clock value for the entire distributed processing system, a smallest of the first definite clock values contained in the updated clock list; and (D) transmitting the updated clock list to a second one of the node apparatuses.

With this arrangement, the clock list is circulated among the nodes apparatuses included in the distributed system, while the clock list is being updated to its latest state. Thus, it is possible to keep track of the entire-system definite clock value (i.e., the second definite clock value) for the distributed processing system.

According to an embodiment, the method may further include: receiving an obtaining command for obtaining a data value that is consistent in the entire distributed processing system; determining whether or not the second definite clock value specified in the specifying is greater than or equal to the logical clock value obtained at a time of receiving the obtaining command or the logical clock value specified by the obtaining command; and outputting, when it is determined that the second definite clock value is greater than or equal to the logical clock value obtained at a time of receiving the obtaining command or the logical clock value specified by the obtaining command, a value of data specified by the obtaining command to a request source of the obtaining command. With this arrangement, when the entire-system definite clock value (i.e., the second definite clock value) for the distributed processing system is greater than or equal to the logical clock value obtained at the time of receiving the obtaining command or the logical clock value specified by the obtaining command, the value of data specified by the obtaining command is output. Thus, it is possible to obtain consistent data corresponding to a specific logical clock value.

In the receiving, when a plurality of the clock lists is circulated, the processing in the updating and the processing thereto are executed each time the clock list is received in the receiving. For example, an increase in the number of clock lists makes it possible to check the definite clock value of the node apparatus at shorter intervals to update the clock lists. Thus, it is possible to more frequently keep track of the entire-definite clock value for the distributed processing system.

In the updating, a value obtained by subtracting a specified value (e.g., 1) from the smallest logical clock value stored in the command-list storage may be determined as the first definite clock value of the firstly node apparatus at a current point in time. This is because, for example, at the first node, the logical clock value up to a value obtained by subtracting the specified value (e.g., 1) from the smallest logical clock value on which processing is not completed can be regarded as being made definite.

According to an embodiment, there is provided a node apparatus for a distributed processing system. The node apparatus includes: (z) a command-list storage unit that stores logical clock values respect to corresponding commands on which processing is not completed, the commands being included in commands received by the node apparatus and the clock values being obtained at a time of receiving the corresponding commands; (a) a receiving unit that receives a clock list containing first definite clock values of the node apparatus and other node apparatuses, the clock list being circulated among the node apparatuses; (b) a clock-list updating unit that determines the first definite clock value of the node apparatus at a current point in time on a basis of a minimum of the logical clock values stored in the command-list storage unit and that updates the first definite clock value of the node apparatus included in the clock list by using the determined first definite clock value; (c) a specifying unit that specifies, as a second definite clock value for the entire distributed processing system, a smallest of the first definite clock values contained in the updated clock list; and (d) a transmitting unit that transmits the updated clock list to another one of the node apparatuses.

A program for causing a computer to execute processing as described above may be created and the program may be stored on computer-readable storage media or storage devices, such as a flexible disk, a CD-ROM (compact disc-read only memory), a magneto-optical disk, a semiconductor memory (e.g., a ROM), and a hard disk. Data during processing may be temporarily stored in a storage device, such as a RAM (random access memory).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A computer-readable, non-transitory medium storing a program for causing a first one of node apparatuses included in a distributed processing system to execute a process, the process comprising:

receiving a clock list including first clock values of respective node apparatuses, the clock list being circulated among the node apparatuses;

determining the first clock value of the first node apparatus at a point in time based on a smallest of logical clock values with respect to corresponding commands on which processing is not completed, the commands being included in commands received by the first node apparatus and the logical clock values being obtained at a time of receiving the corresponding commands and being stored in a command-list storage unit, and updating the first clock value of the first node apparatus, the updated first clock value being included in the clock list, by using the determined first clock value;

specifying, as a second clock value for the distributed processing system, a smallest of the first clock values included in the updated clock list; and transmitting the updated clock list to a second one of the node apparatuses.

2. The computer-readable, non-transitory medium according to claim 1, wherein the process further comprises:

receiving an obtaining command for obtaining a data value that is consistent throughout the distributed processing system;

determining whether the second clock value specified in the specifying is greater than or equal to the logical clock value obtained at a time of receiving the obtaining command or the logical clock value specified by the obtaining command; and outputting, when the determining determines that the second definite clock value is greater than or equal to the logical clock value obtained at a time of receiving the obtaining command or the logical clock value specified by the obtaining command, a value of data specified by the obtaining command to a request source of the obtaining command.

3. The computer-readable, non-transitory medium according to claim 1, wherein, when a plurality of the clock lists is circulated, the processing in the determining, updating and specifying are executed each time the clock list is received in the receiving.

4. The computer-readable, non-transitory medium according to claim 1, wherein the updating determines, as the first clock value of the first node apparatus at a current point in time, a value obtained by subtracting 1 from the smallest logical clock value stored in the command-list storage unit.

5. A clock determination method executed by a first one of node apparatuses included in a distributed processing system, the method comprising:

receiving a clock list including first definite clock values of respective node apparatuses, the clock list being circulated among the node apparatuses;

determining the first clock value of the first node apparatus at a point in time based on a smallest of logical clock values with respect to corresponding commands on which processing is not completed, the commands being included in commands received by the first node apparatus and the logical clock values being obtained at a time of receiving the corresponding commands and being stored in a command-list storage unit, and updating the first clock value of the first node apparatus, the updated first clock value being included in the clock list, by using the determined first clock value;

specifying, as a second clock value for the distributed processing system, a smallest of the first clock values included in the updated clock list; and transmitting the updated clock list to a second one of the node apparatuses.

6. A node apparatus for a distributed processing system, the node apparatus comprising:

a command-list storage unit that stores clock values respect to corresponding commands on which processing is not completed, the commands being included in commands received by the node apparatus and the clock values being obtained at a time of receiving the corresponding commands;

a receiving unit that receives a clock list including first clock values of the node apparatus and other node apparatuses, the clock list being circulated among the node apparatuses;

a clock-list updating unit that determines the first clock value of the node apparatus at a point in time based on a smallest of the logical clock values stored in the command-list storage unit and that updates the first clock value of the node apparatus included in the clock list by using the determined first clock value;

a specifying unit that specifies, as a second clock value for the distributed processing system, a smallest of the first clock values included in the updated clock list; and a transmitting unit that transmits the updated clock list to another one of the node apparatuses.

* * * * *